United States Patent [19]

Hobbs

[11] Patent Number: 5,589,637
[45] Date of Patent: Dec. 31, 1996

[54] EXCITER-MOUNTING FOR SHAKER TABLE

[75] Inventor: Gregg K. Hobbs, Westminister, Colo.

[73] Assignee: Qualmark Corporation, Denver, Colo.

[21] Appl. No.: 344,544

[22] Filed: Nov. 22, 1994

Related U.S. Application Data

[60] Division of Ser. No. 950,631, Aug. 27, 1992, Pat. No. 5,365,788, which is a continuation-in-part of Ser. No. 487,757, Mar. 1, 1990.

[51] Int. Cl.$^6$ .............................................. G01N 29/12
[52] U.S. Cl. .......................... 73/663; 411/178; 403/260; 403/320
[58] Field of Search ............................ 73/662, 663, 665, 73/666, 667, 668; 411/178, 377; 403/260, 258, 320, 297

[56] References Cited

U.S. PATENT DOCUMENTS

| | | | |
|---|---|---|---|
| 1,194,792 | 8/1916 | Stewart | 411/178 |
| 2,438,756 | 3/1948 | Larsen | 74/26 |
| 2,773,482 | 12/1956 | Dickie | 121/20 |
| 3,163,786 | 12/1964 | Dickinson | 310/27 |
| 3,217,531 | 11/1965 | Melton | 73/71.6 |
| 3,277,697 | 10/1966 | Wittkuhns | 73/667 |
| 3,369,393 | 2/1968 | Farmer | 73/71.6 |
| 3,376,790 | 4/1968 | Matson | 91/234 |
| 3,686,927 | 8/1972 | Scharton | 73/71.6 |
| 3,748,896 | 7/1973 | Barrows | 73/71.5 |
| 3,836,098 | 9/1974 | Miyashita | 244/17.27 |
| 4,069,706 | 1/1978 | Marshall et al. | 73/666 |
| 4,164,151 | 8/1979 | Nolan et al. | 73/663 |
| 4,181,025 | 1/1980 | Abstein, Jr. et al. | 73/665 |
| 4,181,026 | 1/1980 | Abstein, Jr. et al. | 73/665 |
| 4,181,027 | 1/1980 | Talbott, Jr. | 73/665 |
| 4,181,028 | 1/1980 | Talbott, Jr. | 73/665 |
| 4,181,029 | 1/1980 | Talbott, Jr. | 73/665 |
| 4,403,511 | 9/1983 | Shibano et al. | 73/665 |
| 4,446,742 | 5/1984 | Thompson, Jr. et al. | 73/663 |
| 4,537,077 | 8/1985 | Clark et al. | 73/665 |
| 4,633,716 | 1/1987 | Martin | 73/663 |
| 4,735,080 | 4/1988 | Stehr | 72/427 |
| 4,735,089 | 4/1988 | Baker et al. | 73/663 |
| 4,925,198 | 5/1990 | Ito et al. | 280/89 |
| 4,996,881 | 3/1991 | Tauscher et al. | 73/663 |
| 5,154,567 | 10/1992 | Baker, deceased et al. | 73/665 |

FOREIGN PATENT DOCUMENTS

| | | | |
|---|---|---|---|
| 948463 | 8/1982 | European Pat. Off. . | |
| 2241348 | 3/1975 | France . | |
| 0033529 | 2/1991 | Japan | 73/663 |
| 160885 | 11/1964 | U.S.S.R. . | |
| 1367285 | 9/1974 | United Kingdom . | |
| 2063379 | 6/1981 | United Kingdom . | |
| 2211268 | 6/1989 | United Kingdom . | |

OTHER PUBLICATIONS

"Acoustic and Vibration Testing, Impact and Blast," Don G. VandeGriff et al., Bulletin 46, The Shock and Vibration Information Center, Naval Research Laboratory, Washington, D.C. (Aug. 1976).

"Mechanical and Pneumatic Shakers for Military Standard 781C," Wayne Tustin, *Proceedings–Institute of Environmental Sciences*, pp. 242–248.

"Low Cost Mechanical Random Shakers," Douglas Nolan, *Proceedings–Institute of Environmental Sciences* pp. 238–241 (1977).

*Primary Examiner*—Hezron E. Williams
*Assistant Examiner*—Rose M. Finley
*Attorney, Agent, or Firm*—James R. Young, Chrisman, Bynum & Johnson, P.C.

[57] ABSTRACT

A shaker table (10) for testing and quality control of devices attached to the table is shown. The mounting table (20) has pneumatic exciters (50) attached thereto. The exciters (50) are attached to the mounting table (20) with a mounting bolt (128) and spacers (132, 132') that comprise an insulating material to inhibit thermal transfer between the device and the exciters (50) and between the mounting table (20) and the exciters (50). The mounting table (20) provides uniform distribution of forces applied by the pneumatic exciters (50). The forces are evenly distributed in all directions from the impact of the exciters on the mounting table. The mounting table (20) is supported on a foundation (2) by adjustable supports (4). The exciters are supplied with pressurized air from a source (12) through an airline (14).

29 Claims, 18 Drawing Sheets

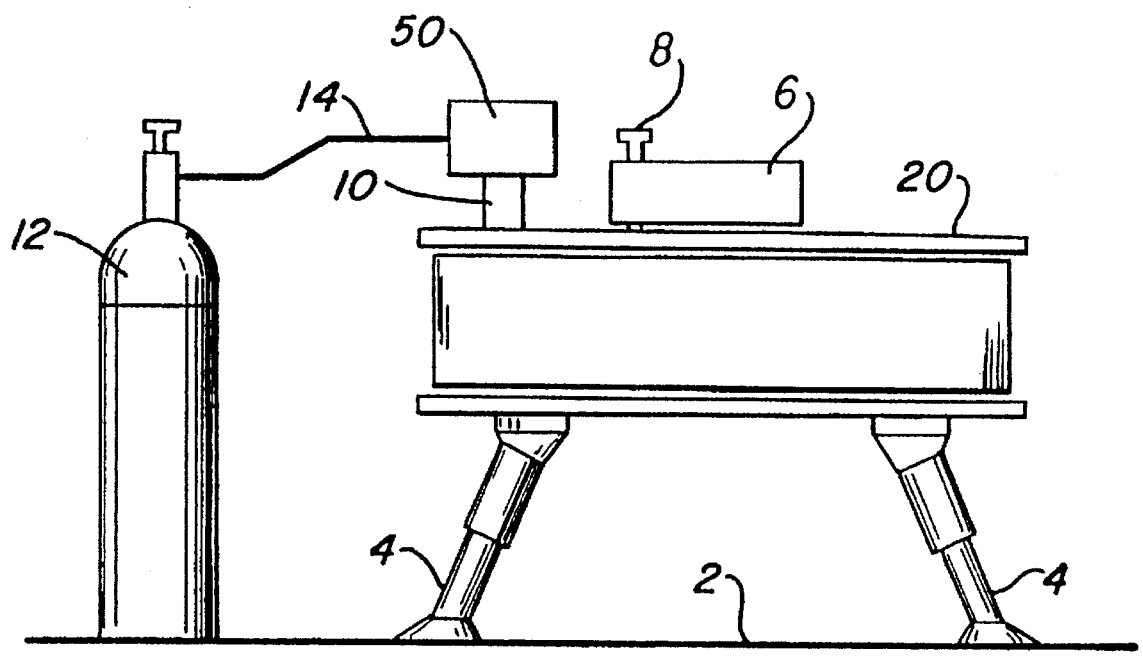
Fig_1
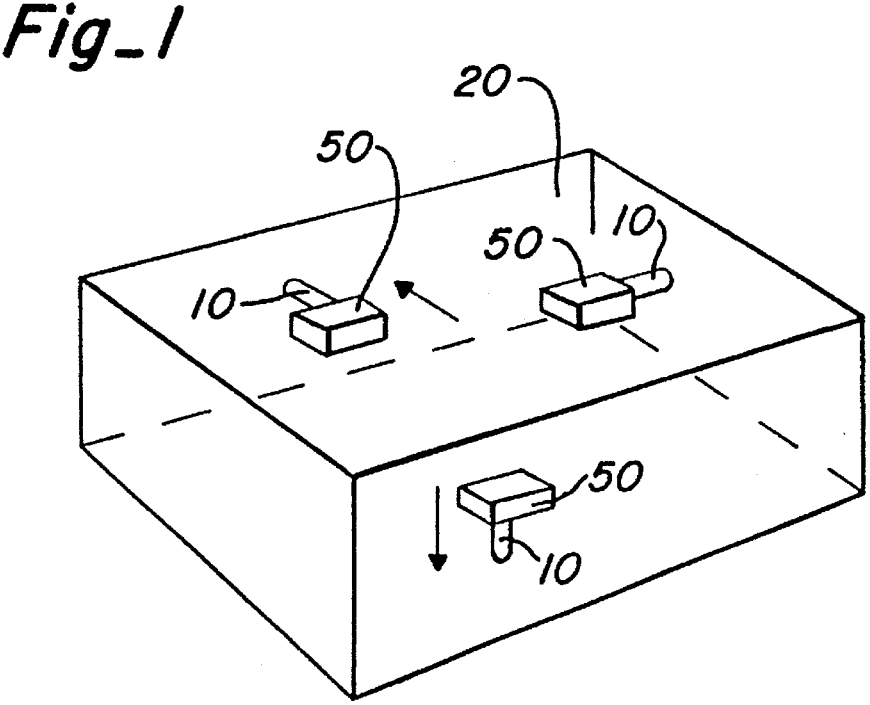
Fig_2

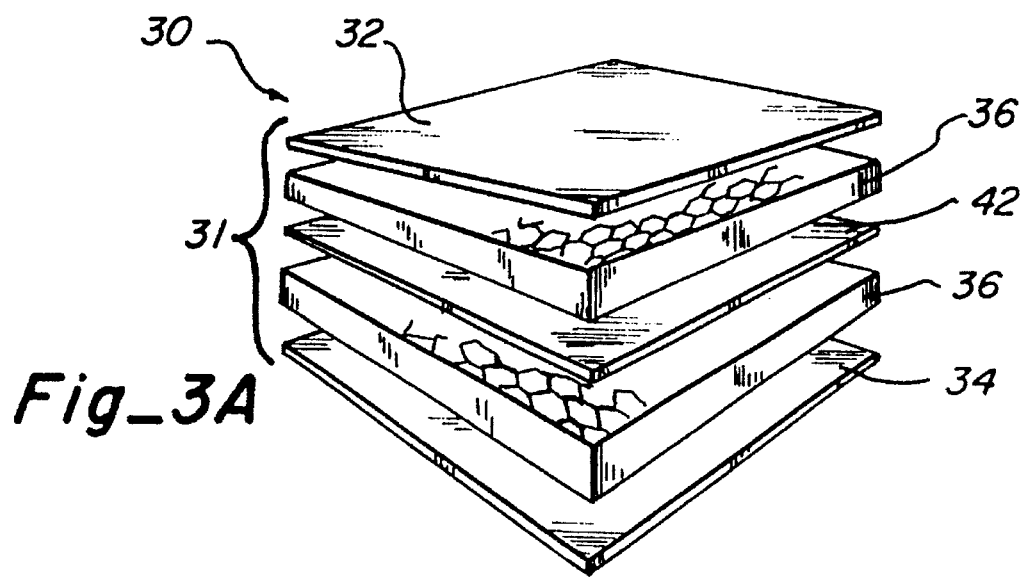
Fig_3A
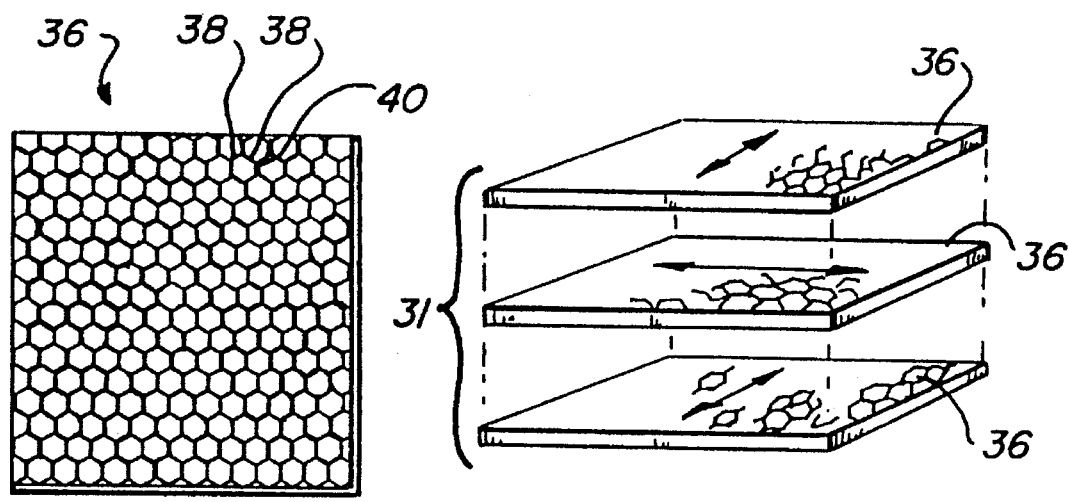
Fig_3B
Fig_3C
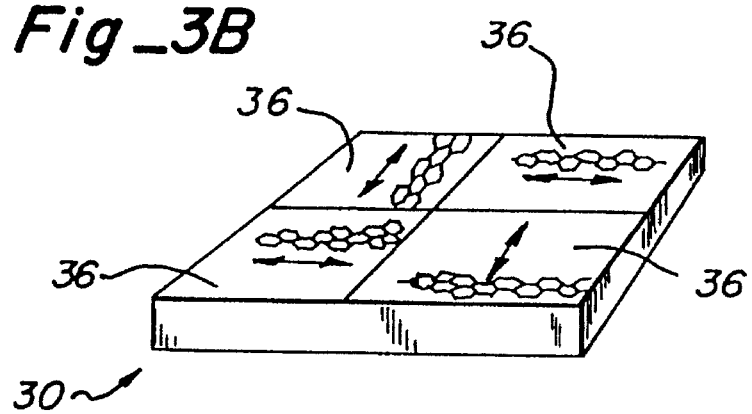
Fig_3D

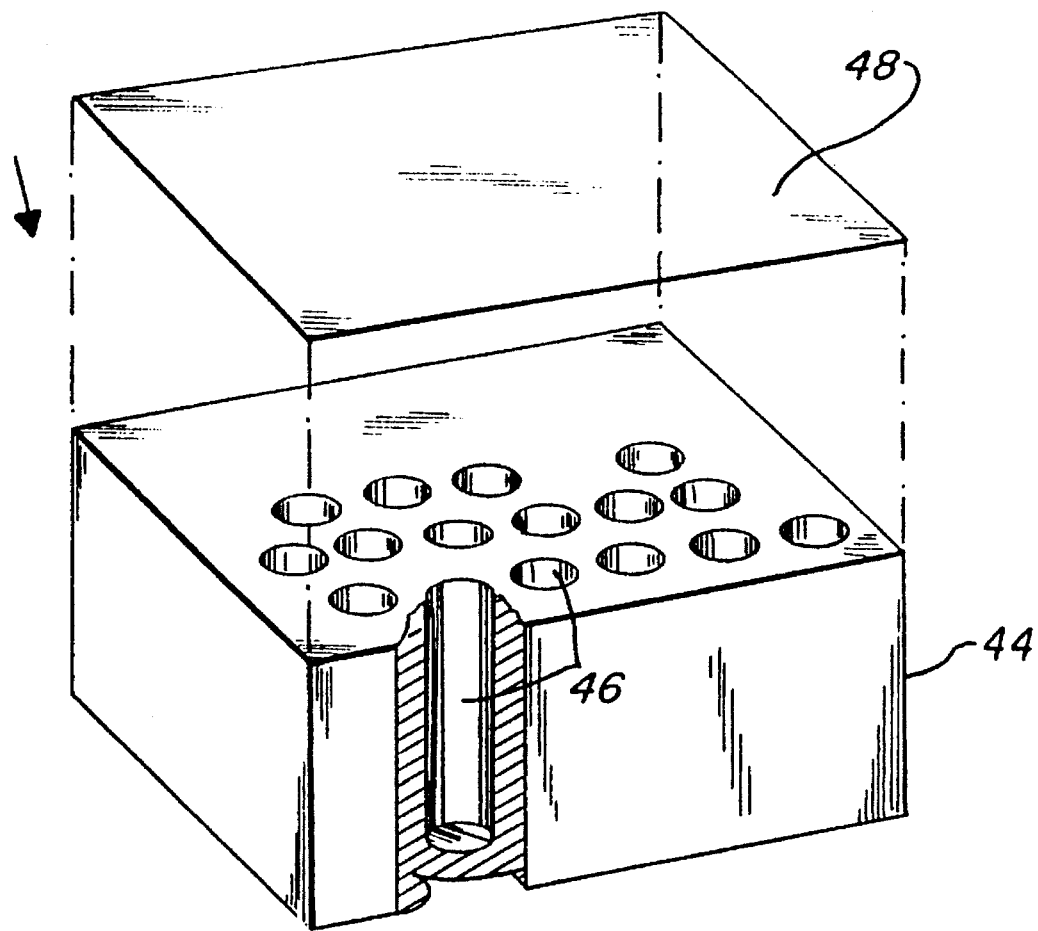
Fig_4
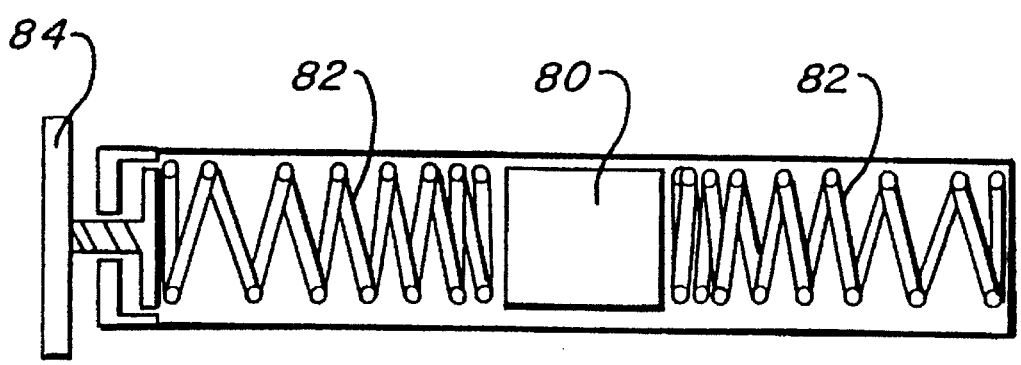
Fig_8

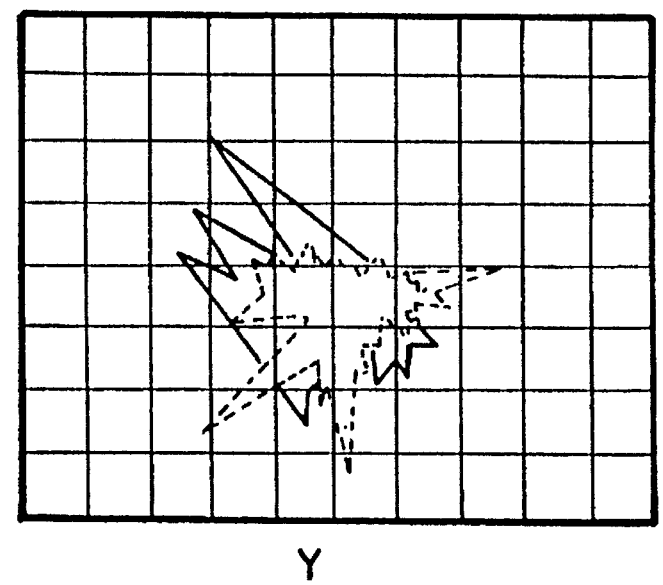
Fig_5A
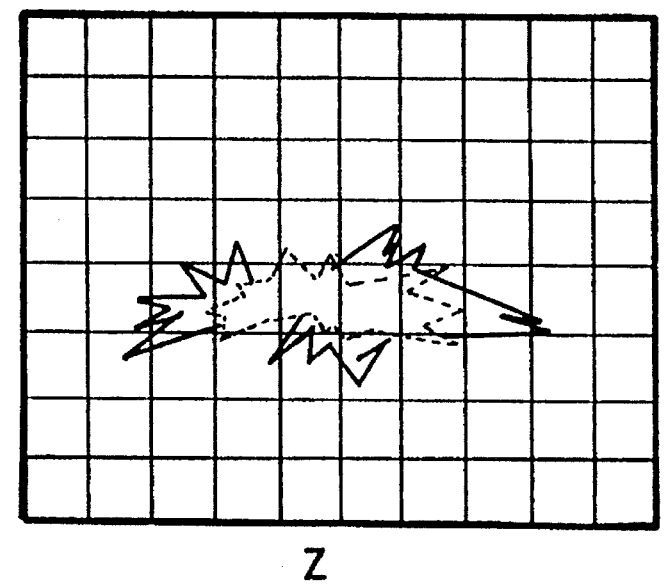
Fig_5B
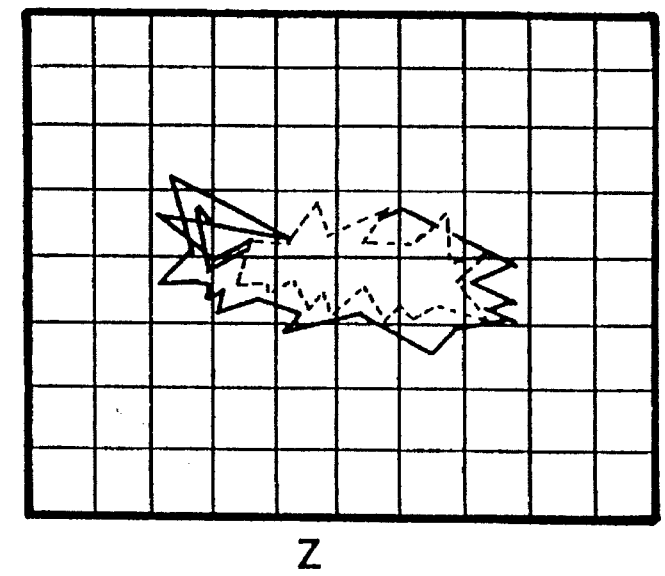
Fig_5C

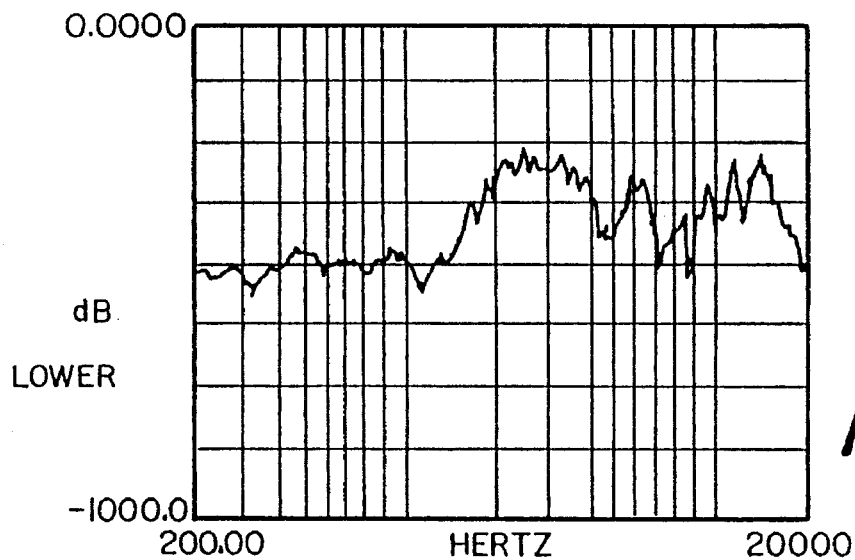
Fig_5D
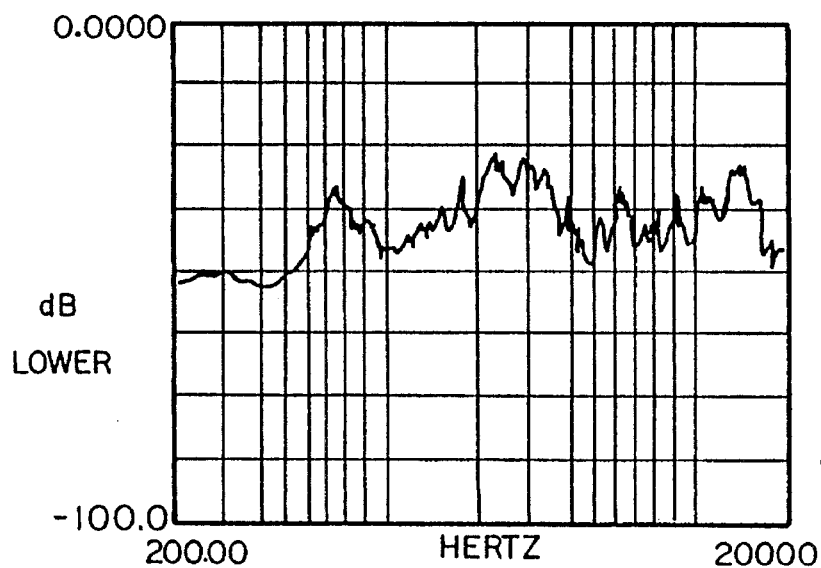
Fig_5E
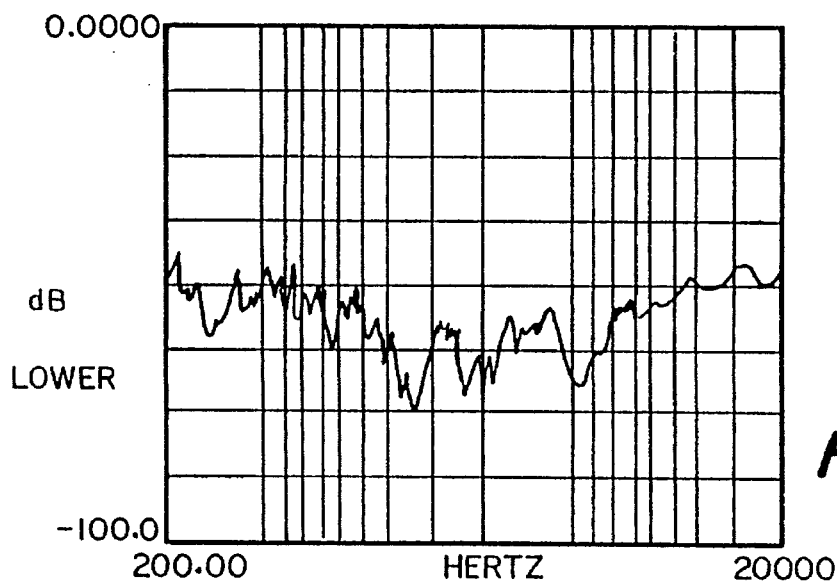
Fig_5F

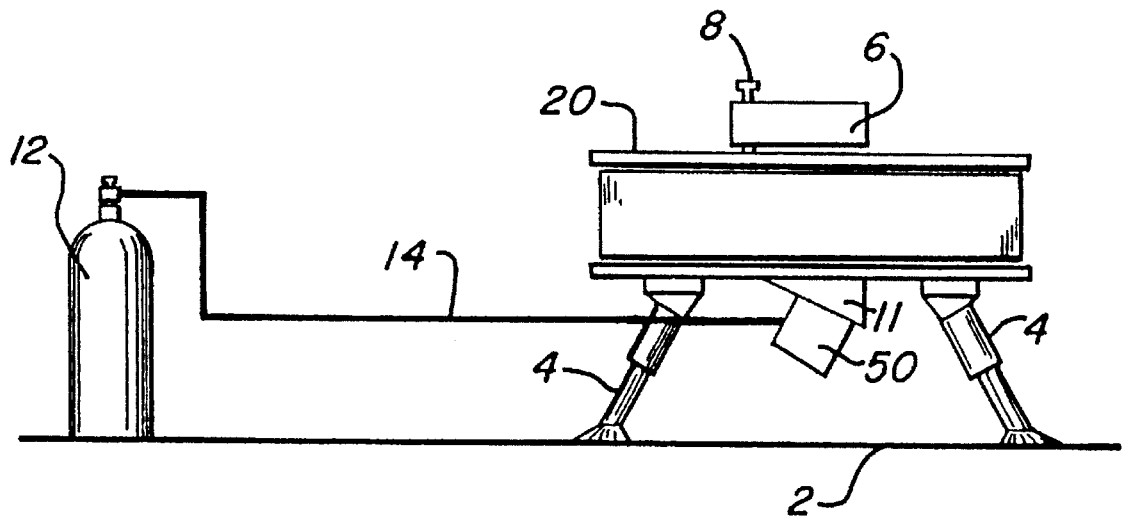
Fig_6A
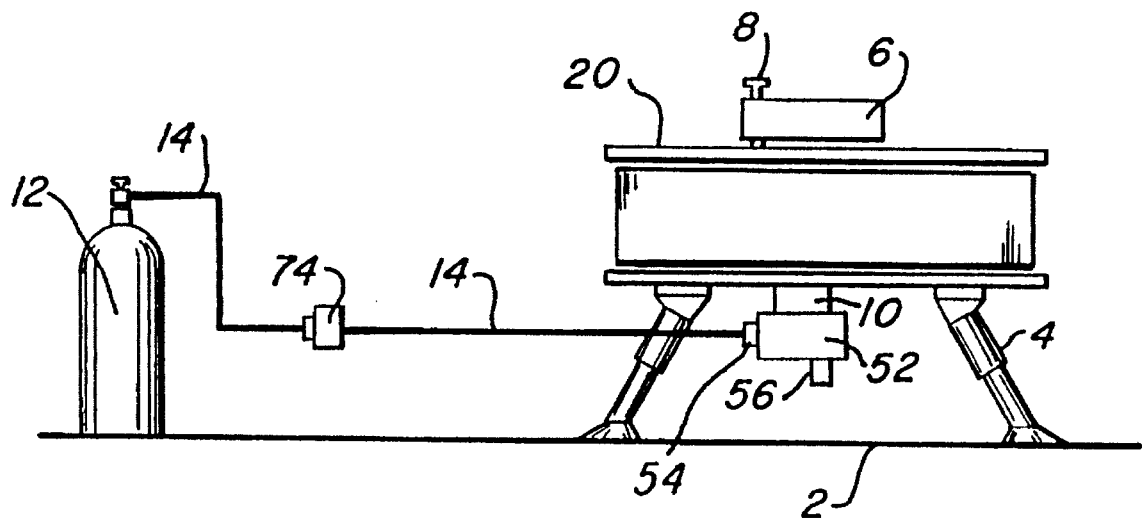
Fig_6D

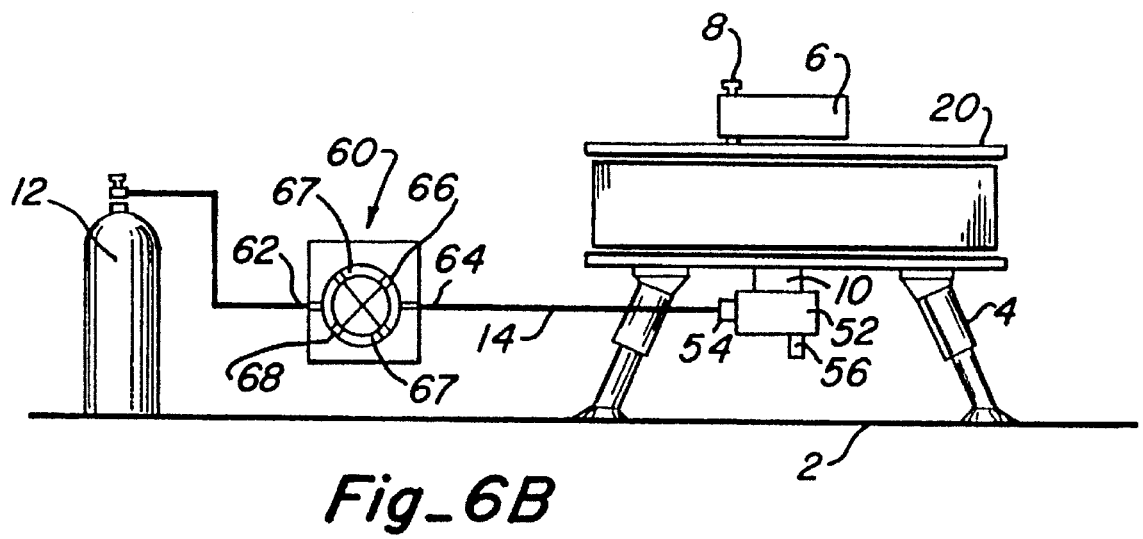
Fig_6B
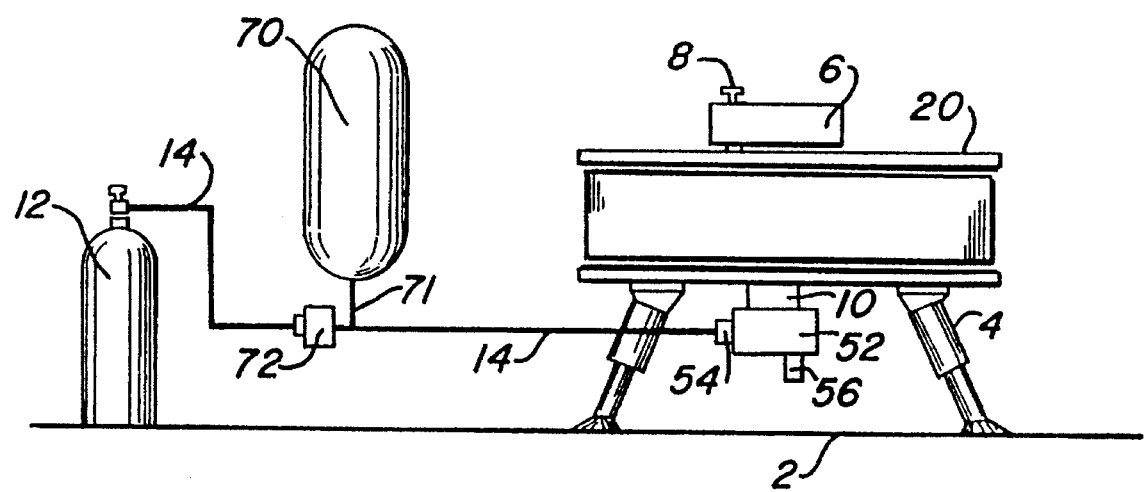
Fig_6C

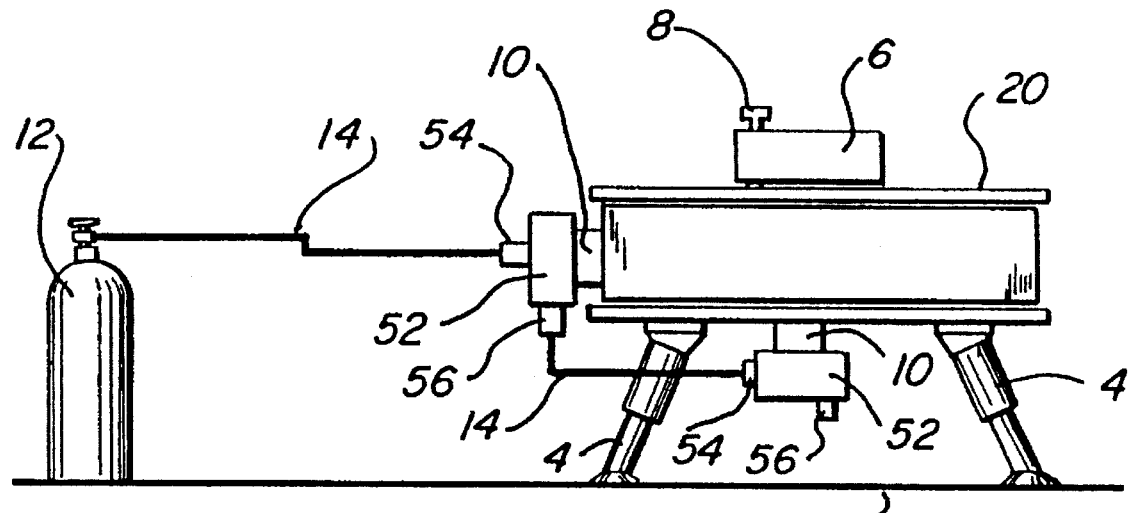
Fig_6E
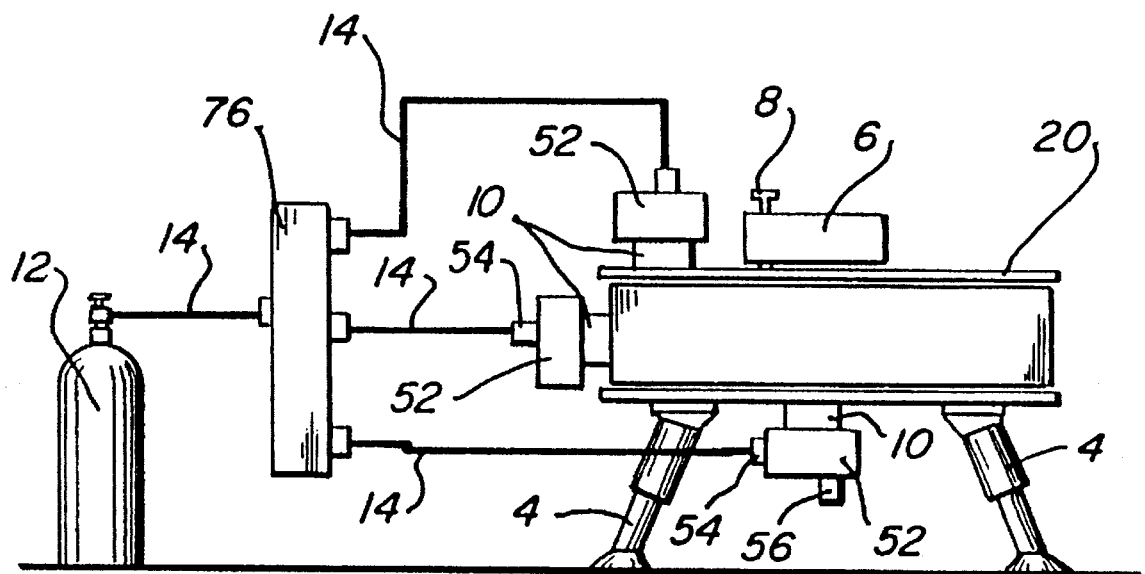
Fig_6F

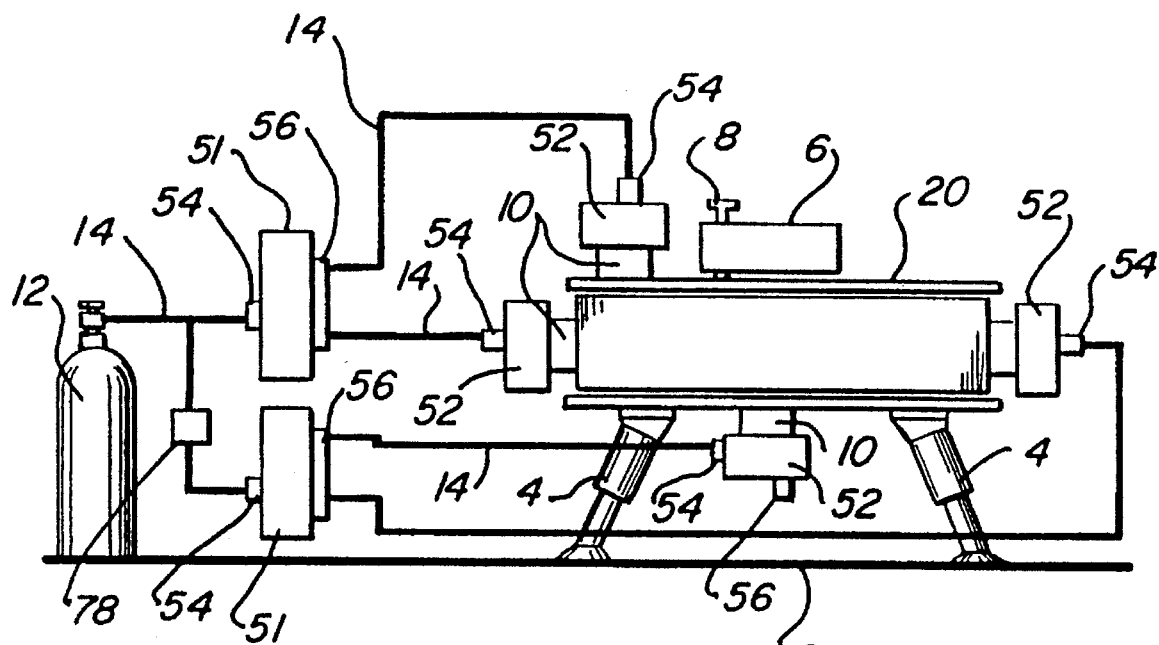
Fig_6G
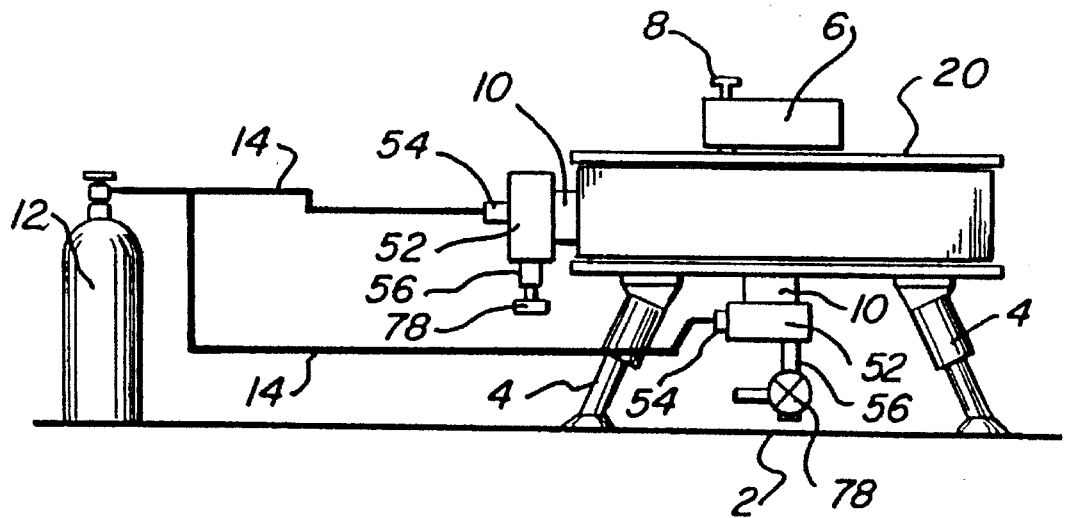
Fig_7A

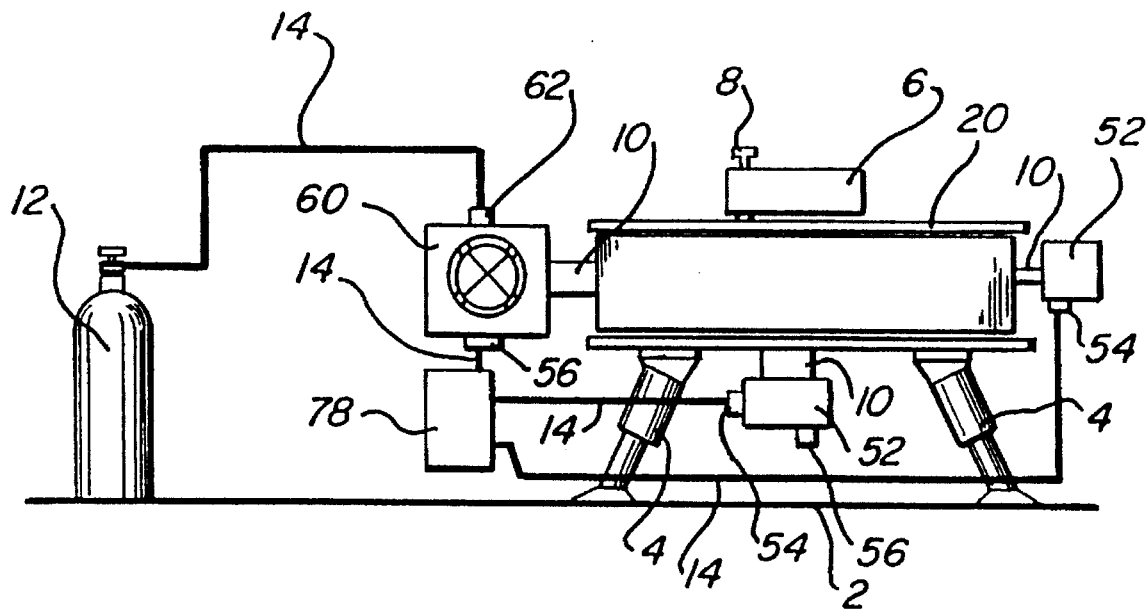
Fig_7B
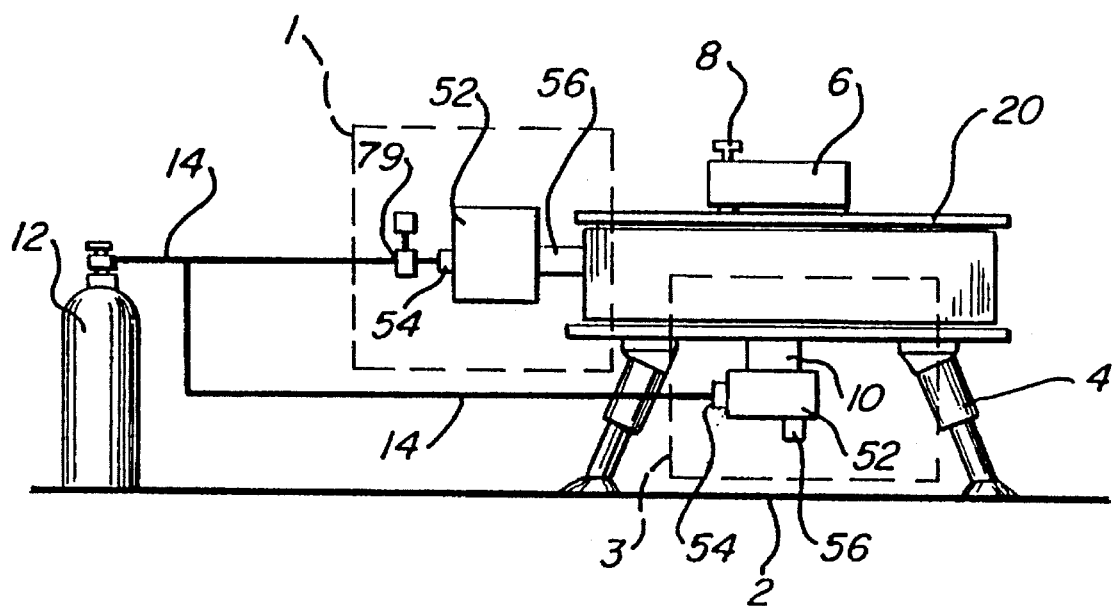
Fig_7C

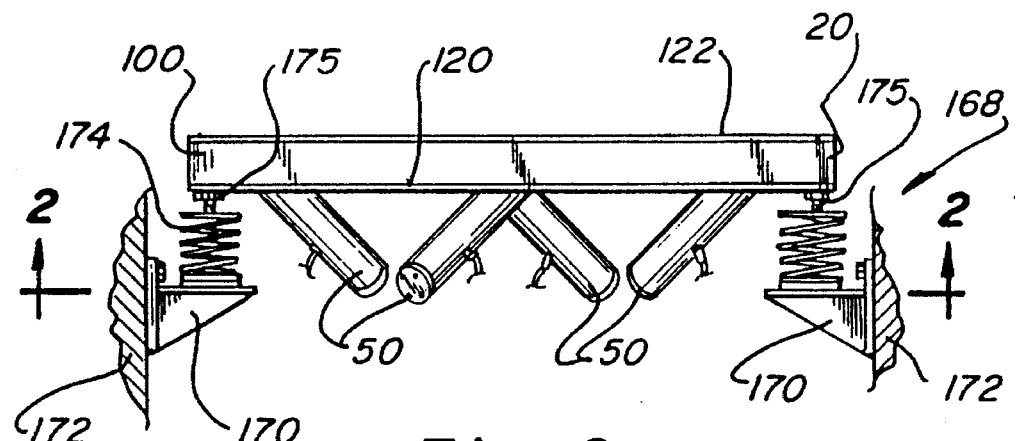
Fig_9
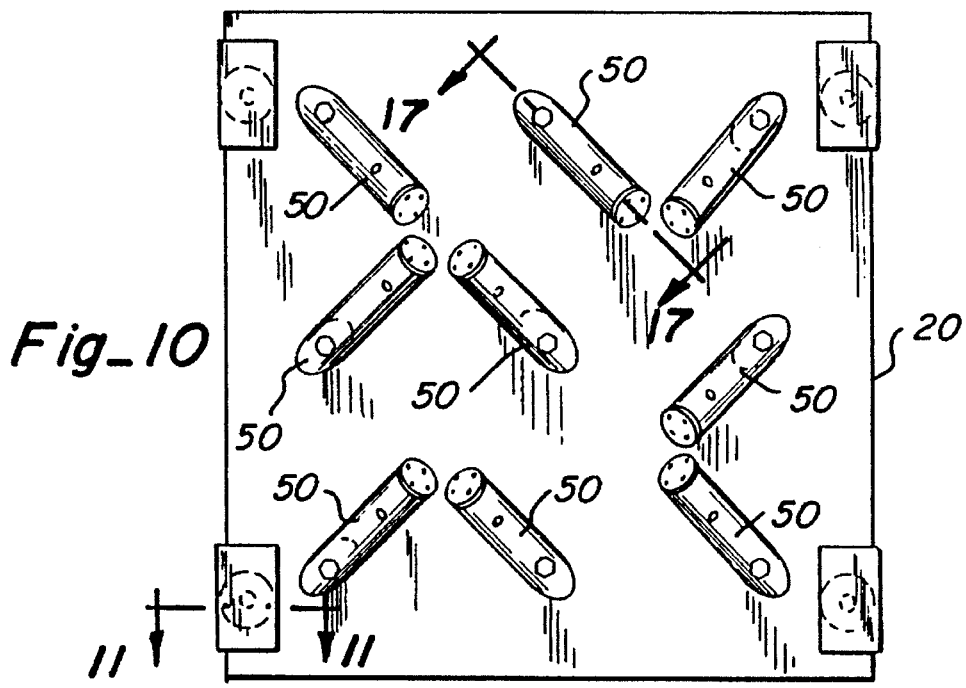
Fig_10
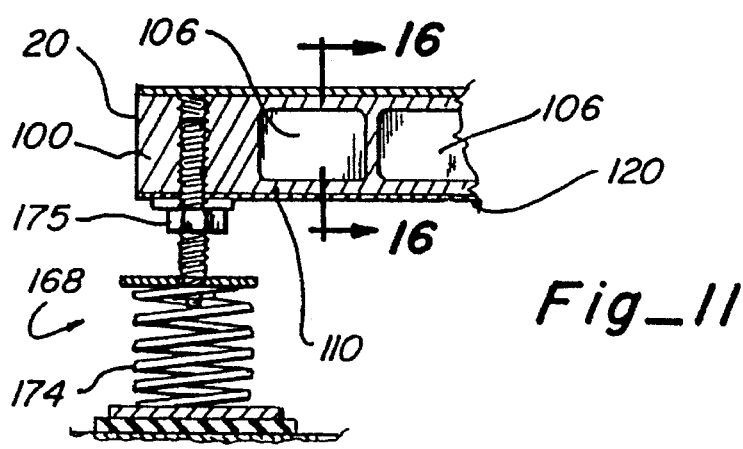
Fig_11

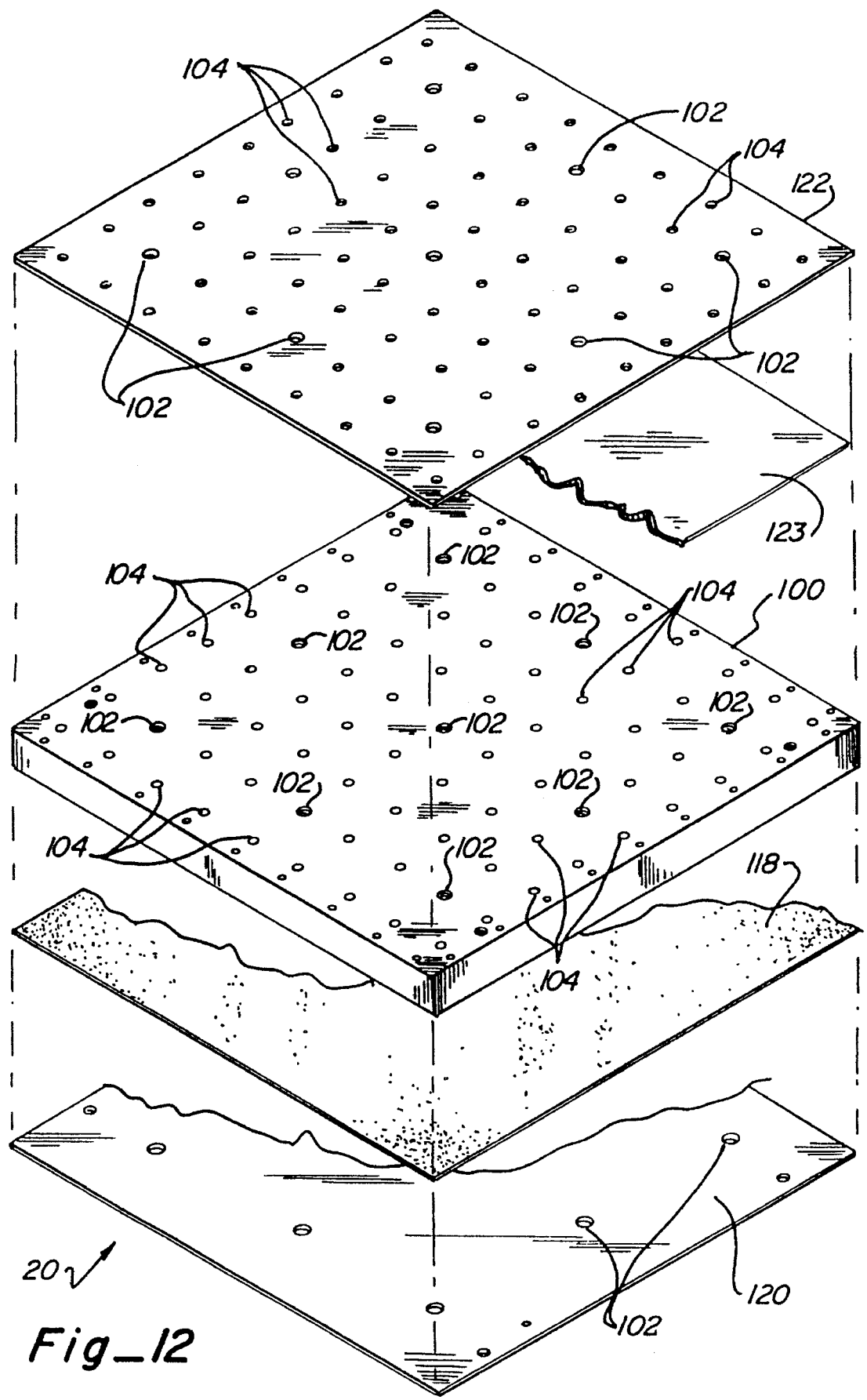
Fig_12

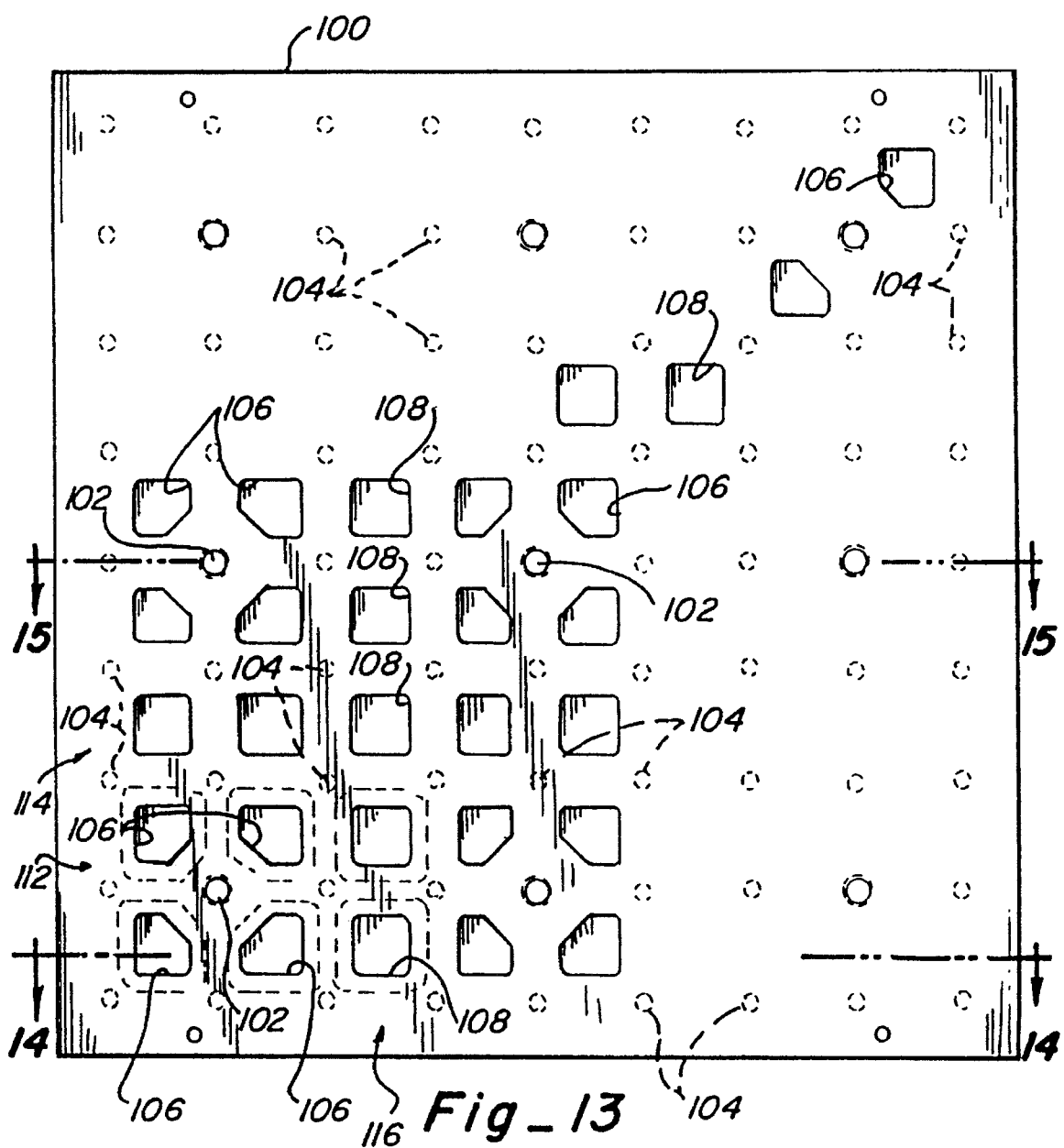
Fig_13
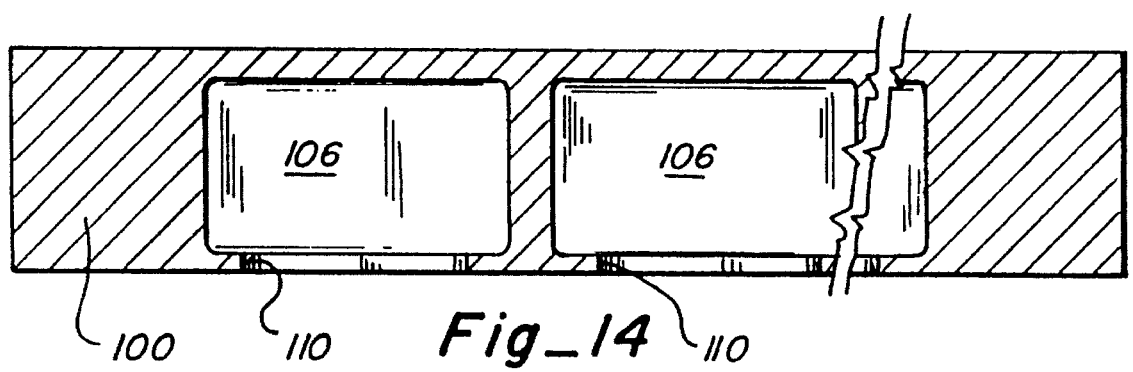
Fig_14

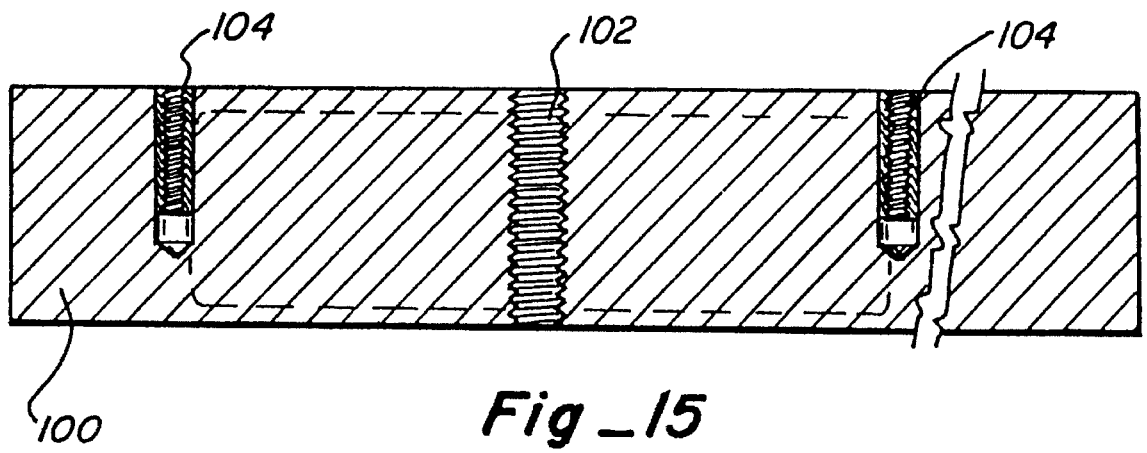
Fig_15
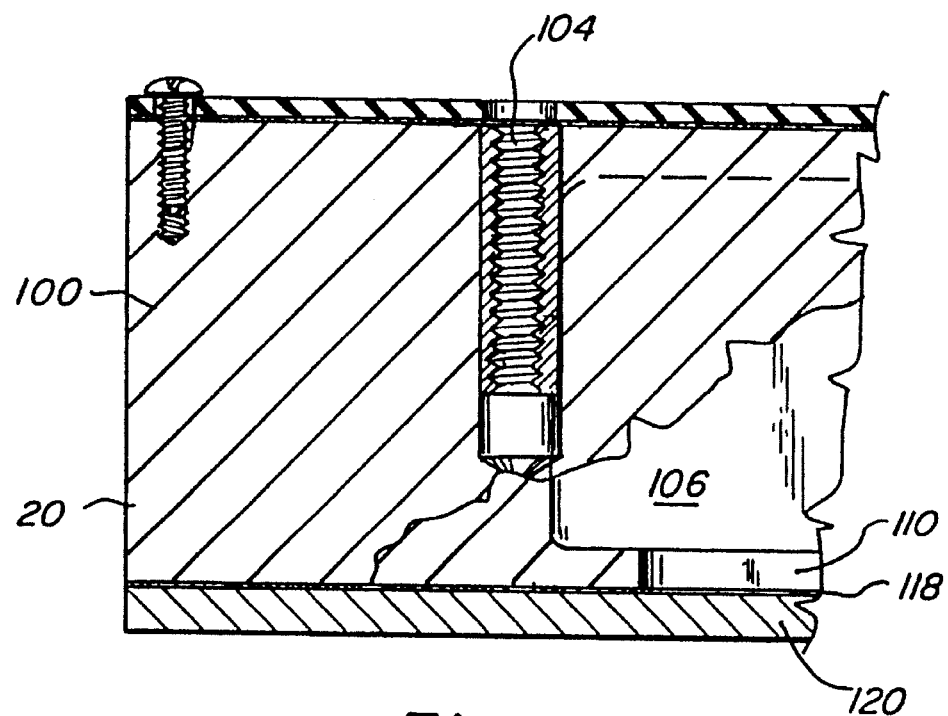
Fig_16

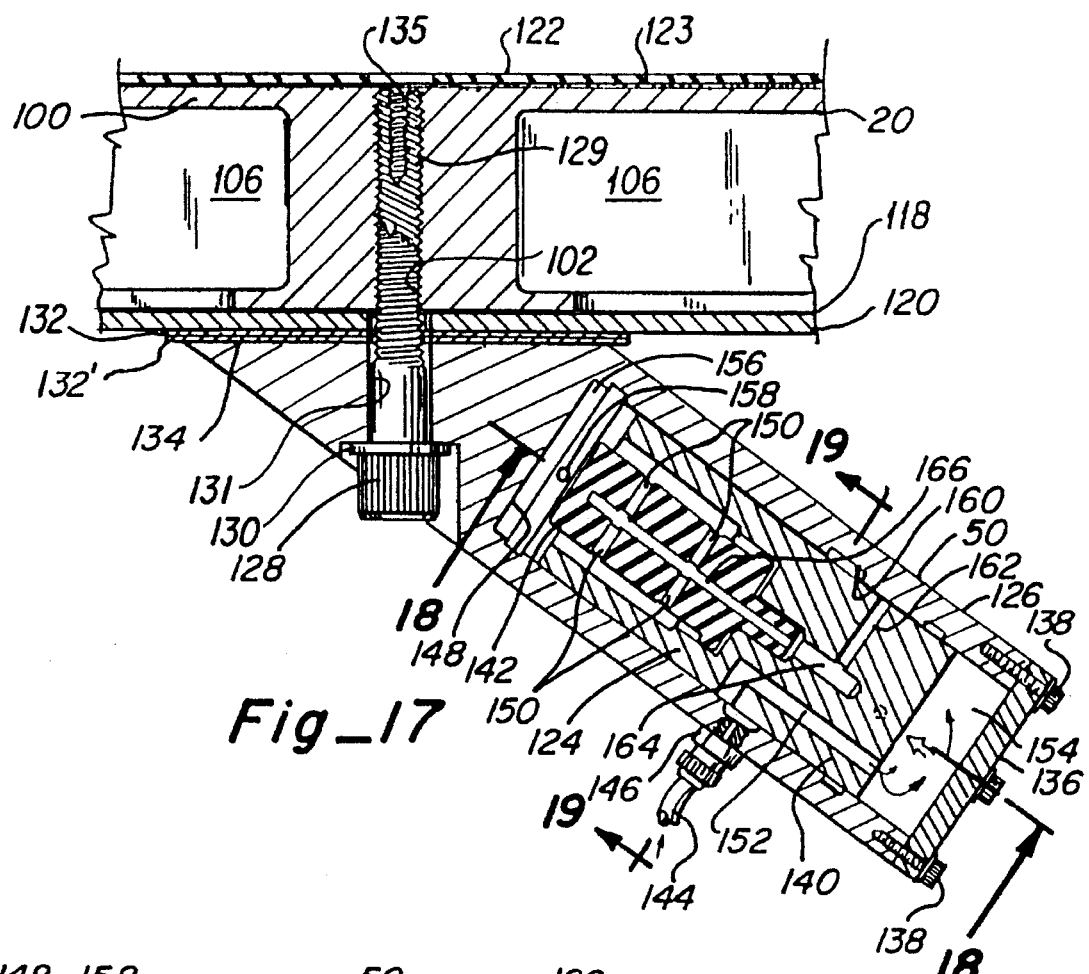
Fig_17
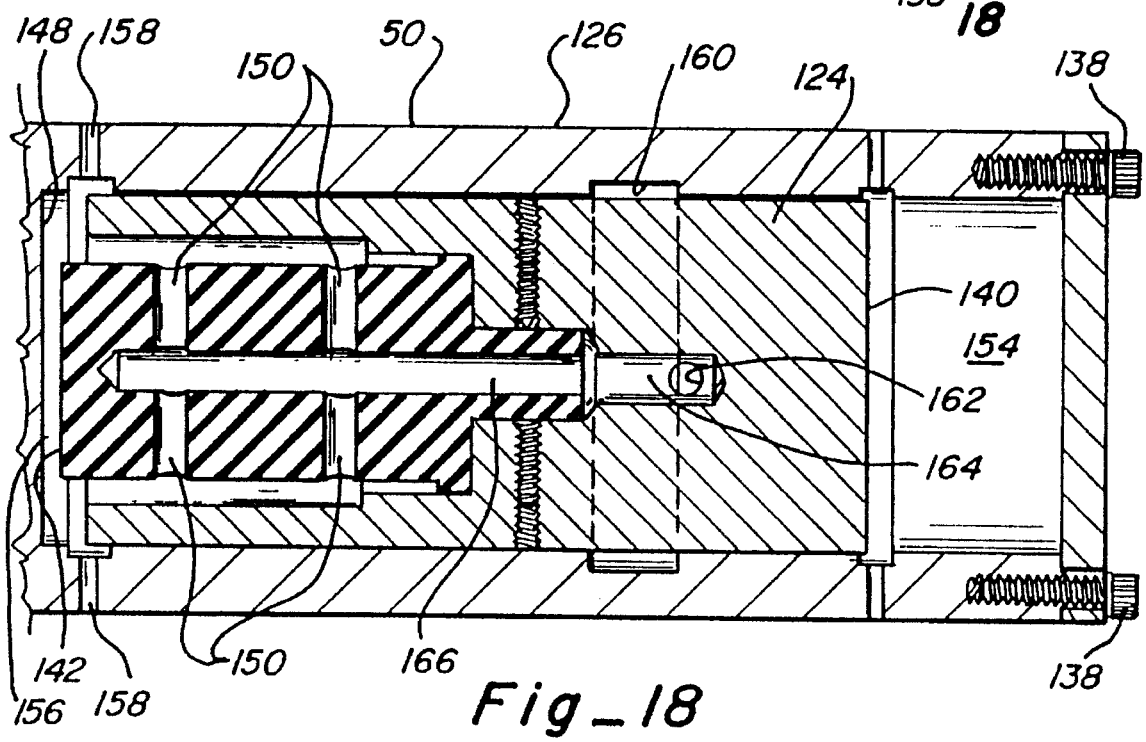
Fig_18

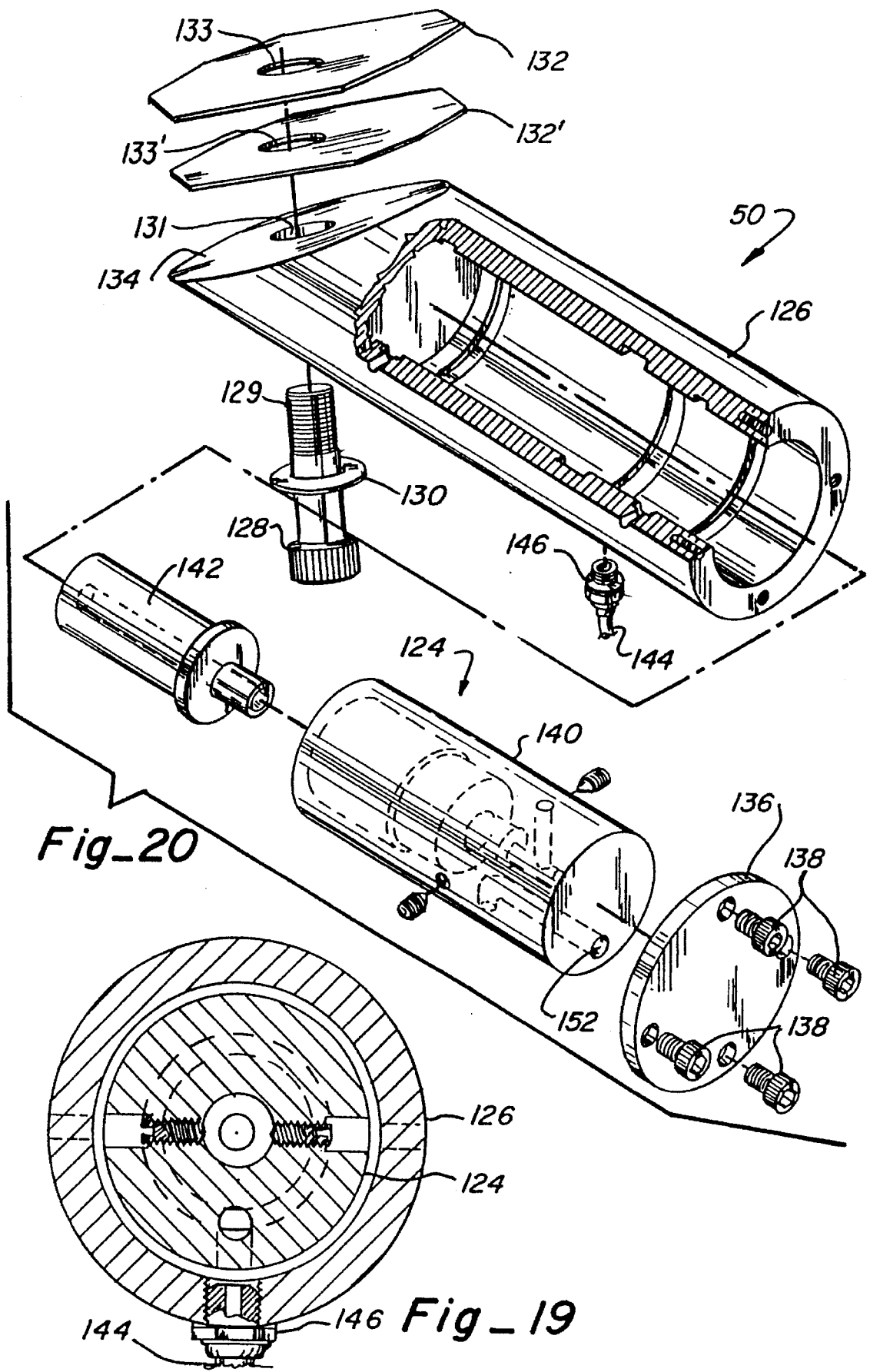

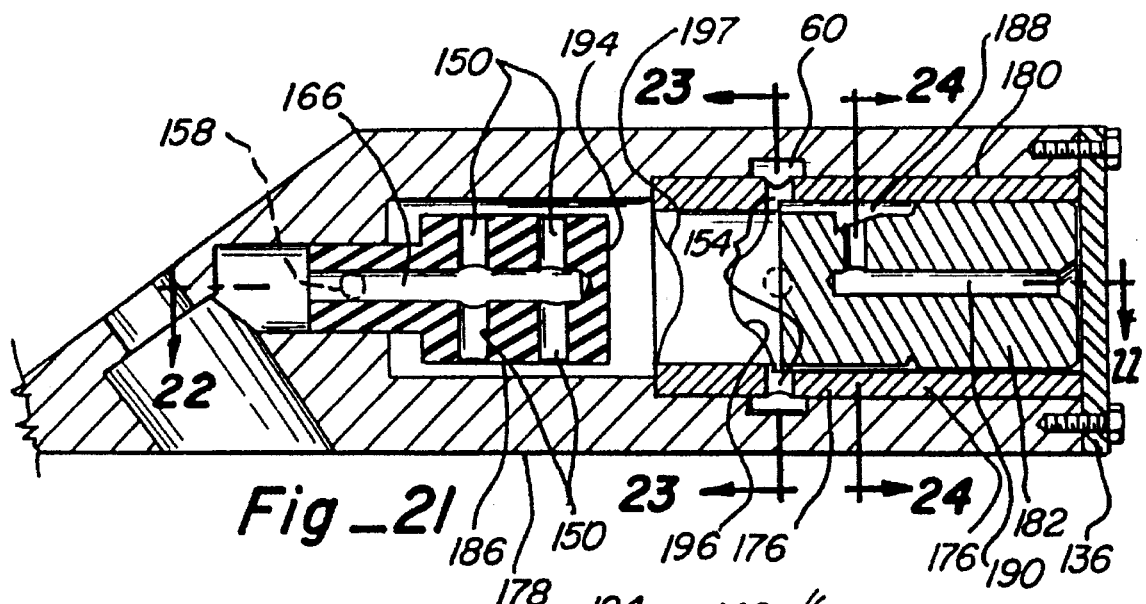
Fig_21
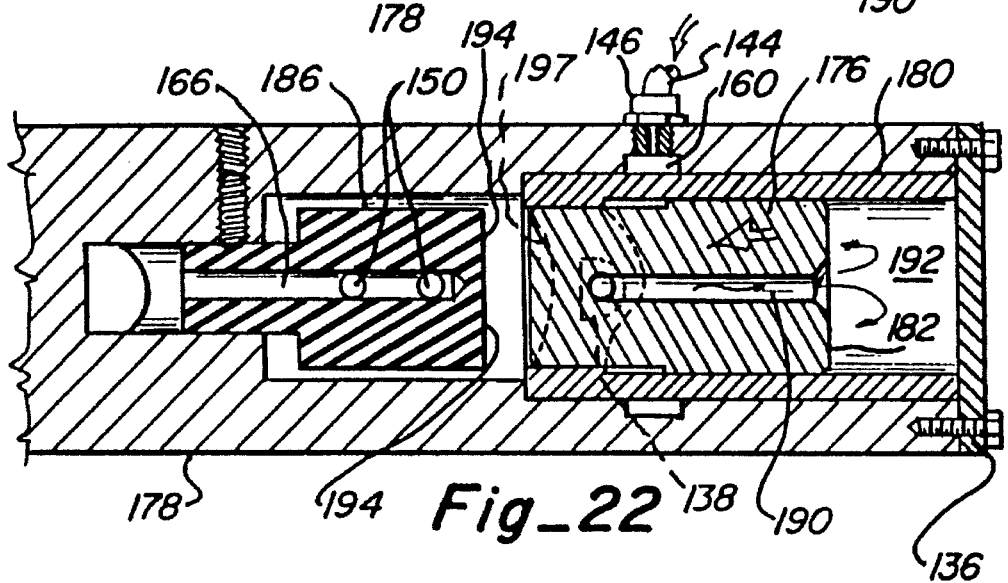
Fig_22
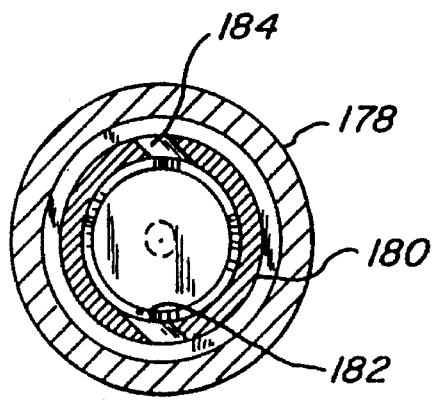
Fig_23
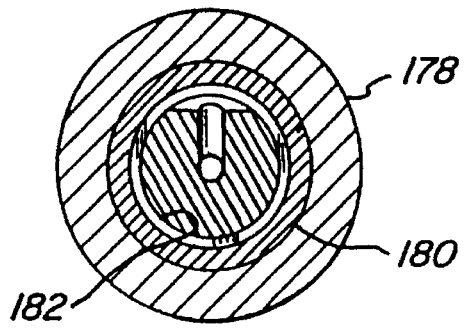
Fig_24

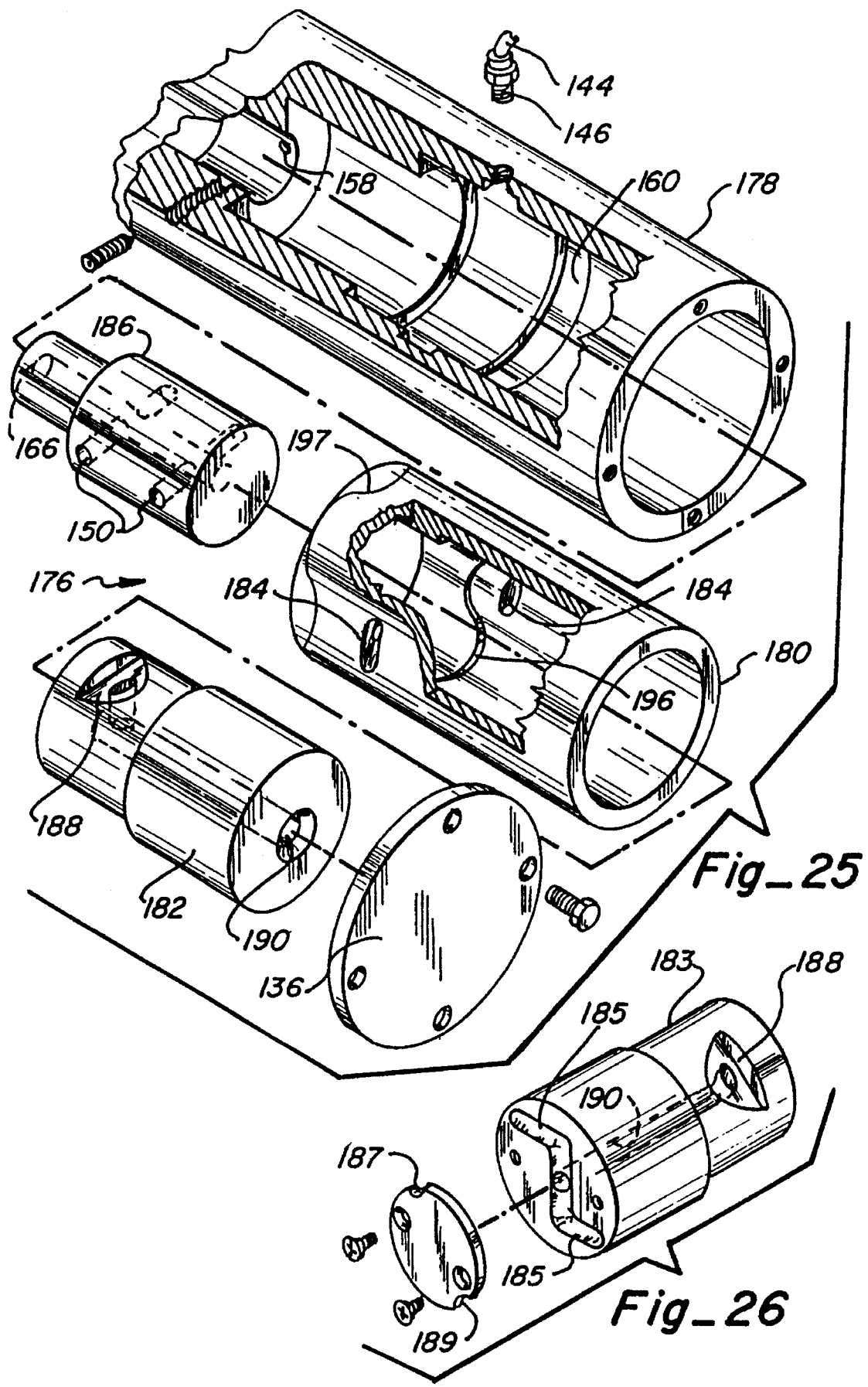
Fig_25
Fig_26

EXCITER-MOUNTING FOR SHAKER TABLE

This application is a divisional of application Ser. No.07/950,631, filed Aug. 27, 1992, for Random Vibration Generating Apparatus, now U.S. Pat. No. 5,365,788 which is a 35 U.S.C. § 371 application of PCT/US91/01429, filed on Mar.1, 1991, which is a continuation-in-part of application Ser. No. 07/487,757, filed Mar. 1, 1990, for Method and Apparatus for Generating Substantially Uniform, Randomly Oriented Vibrations in a Shaker Table, now abandoned.

BACKGROUND OF THE INVENTION

1. Field of the Invention

The present invention relates generally to the shaker tables to which manufactured devices are mounted for vibrational testing. More particularly, the present invention relates to a specific mounting table, the exciters or vibrators mounted thereto, and the means to inhibit thermal transfer from the device and mounting table to the exciters or vibrators.

2. Description of the Prior Art

Shaker tables for testing the reliability of manufactured devices are well known. Such shaker tables are used either under laboratory conditions or in conjunction with an assembly line. Often, shaker tables are mounted within thermal chambers, which gives the added flexibility of testing for defects in the manufactured product which may be exposed by elevated temperature or temperature cycling.

The shaker tables typically include a platform or mounting table upon which a device to be tested is mounted. Exciters or vibrators are attached to the mounting table to vibrate the device. It is necessary to provide an even distribution of the vibration amplitude, magnitude, direction and frequency in a range. Typical of such arrangements is U.S. Pat. No. 4,735,089 issued to Richard L. Baker, et al. That patent and others attempt to establish a uniform amplitude to the mounting table from the exciters over the range of frequencies generated.

The Baker patent identifies a problem with rigid shaker tables in achieving the objective of creating random vibration of substantially equal amplitude over the range of frequencies in a multi-axial direction. Baker does so by use of a flexible shaker table that is said to resolve potential resonance problems normally inherent in rigid mounting tables. The end result of this multi-axial excitation is a relatively complex mounting table or platform, having multiple layers, multiple connectors and multiple potential wear points.

SUMMARY OF THE INVENTION

It is the principal object of the present invention to provide a rigid mounting table of a shaker table which randomly disburses any given force applied to the shaker table by an exciter in a multi-axial direction and in a substantially uniform manner.

It is a further object of the present invention to provide a shaker table positioned inside a thermal chamber.

It is a further object of the present invention to minimize the thermal load on the chamber by reducing thermal transfer between the shaker table and the exciter and between the device under test and the exciter.

Accordingly, the present invention is directed to a shaker apparatus with a mounting table made of a cored or honeycomb structure in such a way that the mounting table, together with any device or manufactured product attached thereto, when vibrated by an exciter, will provide multi-axial random or quasi-random vibrations, even if the excitations are delivered to the table in only one axial direction, due to the dispersive effects of the cored or honeycomb structures and the mode of construction of the mounting table or platform. Manufactured or test devices are connected to the mounting table, which can be supported within a test chamber.

This invention is also directed to a method of changing the distribution of relative magnitudes of the x, y, z, and rotational components of the vibrations by manipulation or arrangement of the exciters which impart excitations to the shaker table.

A section of aluminum honeycomb assembly has been tested by placing a triaxial set of accelerometers thereto. A modal hammer was used to excite the assembly normal to the assembly and then in the planes of the assembly and the responses were measured in each case. Regardless of the axis of excitation, responses in all axes were observed. Subsequent theoretical analysis of the reason for this behavior led to the conclusion that stress wave propagation scattering (or deflection from its path) was due to the stress wave encountering a junction of the honeycomb assembly. A "junction" is an intersection of the top or bottom face sheets with the assembly, the intersection of a common inter layer sheet with a honeycomb structure, or the intersection of a honeycomb structure with another honeycomb structure oriented in a different direction within the same layer.

The junctions deflect energy from one direction into energy in directions other than the direction of the arriving elastic wave. This effect generates a response in all directions after multiple refractions and reflections of the stress wave within the honeycomb assembly. This physical phenomena allows the operation of this invention wherein the elastic wave scattering will help generate multi-axial vibration with only a limited number of exciters. A similar effect occurs in the cored structure and is described in more detail herein.

In an alternative embodiment, the mounting table includes a central core of homogeneous material having a preselected area and thickness. A mounting surface covers one or more surfaces of the central core. Mounting holes are formed in the mounting surface. A bottom surface of the central core has a plurality of cavities formed therein along predefined or perpendicularly intersecting rows and columns, defining a junction of the intersection. The bottom surface is covered with an adhesive layer and an aluminum sheet, covering the open cavities.

In addition to the mounting table construction, multi-axial vibration is enhanced by vectoring of the exciters. Variations in the line spectra of the excitations from the exciters may be accomplished by modulating the air pressure imparted to the exciters or emanating from the exciters. This modulation can be accomplished by using the exhaust of a rotary ball vibrator as the input to one or more linear exciters. The exhaust pressure from the rotary ball vibrator is modulated in an irregular but cylindrical fashion as the ball rotates and passes an exhaust port. The rotary vibrator can be used to add low frequency excitation to the mounting table.

Modulation can also be accomplished by varying the exhaust back pressure on the linear exciters in order to control the cycle rate of the impacts.

Another modulation method is to pressurize an accumulator and exhaust the air to the exciters while holding the accumulator input closed, allowing the pressure to decrease as the exciters use the air. This will sweep the line spectra generated by the exciters. After the air pressure has dropped to some desired pressure, the inlet of the accumulator is opened and the air pressure is thereby increased again sweeping the cycle ram of the exciters. This is repeated as necessary. A combination of accumulators can also be used as an extension of this technique.

Also, the exhaust from the linear exciters can be throttled or restricted to control the excitation frequency. An analog voltage controlled pressure regulator can also be used to control inlet pressure which is modulated over time to attain the desired spectrum smearing.

Any combination of the foregoing modulation methods together with other methods detailed herein can be used without departing from the scope and spirit of the invention. A tunable dampening device is shown to dampen the vibrations in the table in one axial direction, with the extent of dampening capable of being easily adjusted.

The exciters are attached to the mounting table through attachment holes. The exciters include an outer cylinder to which an air inlet is connected. A hollow interior of the cylinder receives a piston assembly comprised of an outer body and a resilient programmer connected thereto. The programmer reciprocates within the cylinder and strikes a rebound surface near the position at which the exciter is connected to the mounting table.

The piston assembly goes through a thrust stroke and a rebound stroke in completing a cycle. Inlet passageways in air fluid communication with the air inlet means direct pressurized air through the outer body of the piston and into an interior thrust chamber of the cylinder. The piston assembly moves toward the rebound surface of the cylinder where a rebound chamber is defined, exhausting air through the exhaust port and striking the rebound surface of the cylinder with the programmer of the piston assembly. In the rebound stroke the air inlet means supplies air to the programmer, which programmer, through cooling passageways, pressurizes the rebound chamber and moves the piston assembly away from the rebound chamber and toward the thrust chamber.

In an alternative embodiment of the exciter, the piston assembly includes means for rotating a piston in the cylinder. As the piston rotates the stroke length varies. The size of the inlet through which pressurized air from the air inlet means is received by the piston, and/or the size of the exhaust port, change as the piston is randomly rotated. This varies the pressure in the thrust chamber and, correspondingly, the speed and force with which the piston strikes the rebound surface.

This invention meets the need for a rigid shaker apparatus which accurately translates intended vibrations to a device to be tested without encountering local resonance peaks, and it solves the resonance problem without using elastomeric or other damping means. The apparatus relies on the elastic wave scattering effects of the cored, honeycomb or cavity filled structure. Since damping techniques are not used, the desired multi-axial vibrations can be generated using only a limited number of exciters, and only a limited amount of excitation.

Other aspects, features and details of the present invention can be more completely understood by reference to the following detail description of a preferred embodiment, taken in conjunction with the drawings, and from the appended claim.

BRIEF DESCRIPTION OF THE DRAWINGS

The accompanying drawings, which are incorporated in and form a part of the specifications, illustrate the preferred embodiments of the present invention, and together with the descriptions serve to explain the principles of the invention.

FIG. 1 is a perspective view of the entire shaker apparatus.

FIG. 2 is a perspective view of one embodiment of the invention.

FIG. 3A is an exploded diagrammatic side view of one embodiment of a mounting table of FIG. 1 using a honeycomb assembly.

FIG. 3B is a top view in enlarged scale of the honeycomb structure used in the embodiment of the mounting table.

FIG. 3C is an exploded diagrammatic perspective view of an embodiment of the honeycomb assembly where a plurality of honeycomb layers are combined in a vertical array to from the shaker table of the invention.

FIG. 3D is an exploded diagrammatic perspective view of another embodiment of the honeycomb assembly where a plurality of honeycomb layers are combined in a planar array to form the shaker table of the invention.

FIG. 4 is a perspective view of one embodiment of the table of FIG. 1 using a cored configuration.

FIG. 5A is a graph depicting the x versus y directional response in a test device used in the shaker apparatus depicted in FIG. 1 indicating that the various axial directions are incoherent relative to one another.

FIG. 5B is a graph depicting the x versus z directional response in a test device used in the shaker apparatus depicted in FIG. 1 indicating that the various axial directions are incoherent relative to one another.

FIG. 5C is a graph depicting the y versus z directional response in a test device used in the shaker apparatus depicted in FIG. 1 indicating that the various axial directions are incoherent relative to one another.

FIG. 5D is a graph depicting the vibrational response in the x direction of a test device used in the invention.

FIG. 5E is a graph depicting the vibrational response in the y direction of a test device used in the invention.

FIG. 5F is a graph depicting the vibrational response in the z direction of a test device used in the invention.

FIG. 6A is a diagrammatic depiction of an embodiment of the invention wherein a wedge-shaped support is provided for vectoring the excitations.

FIG. 6B is a diagrammatic depiction of another embodiment of the invention wherein air pressure to the exciter is modulated by a rotary vibrator.

FIG. 6C is a diagrammatic depiction of yet another embodiment of the invention wherein air pressure to the exciter is modulated by an accumulator.

FIG. 6D is a diagrammatic depiction of yet another embodiment of the invention wherein air pressure to the exciter is modulated by an analog valve.

FIG. 6E is a diagrammatic depiction of yet another embodiment of the invention wherein pressure to a second exciter is modulated to output from a first exciter.

FIG. 6F is a diagrammatic depiction of yet another embodiment of the invention wherein air pressure to each of several exciters is modulated by feeding each exciter with air through a single manifold.

FIG. 6G is a diagrammatic depiction of yet another embodiment of the invention showing a combination of throttling, use of several exciters being fed by one line, and use of large and small exciters.

FIG. 7A is a diagrammatic depiction of yet another embodiment of the invention wherein air pressure in the exciter is modulated by valving on the exciter exhaust.

FIG. 7B is a diagrammatic depiction of yet another embodiment of the invention wherein the input of several exciters receive air from a single manifold which in turn receives modulated air pressure from the exhaust of a rotary ball vibrator.

FIG. 7C is diagrammatic depiction of yet another embodiment of the invention wherein air pressure from exhaust of the exciter is restricted.

FIG. 8 is a diagrammatic depiction of a tunable damper for notching the vibration FIG. 9 is a front elevational view of yet another embodiment a shaker table fabricated in accordance with the invention.

FIG. 10 is a bottom plan view of the invention.

FIG. 11 is a fragmentary enlarged sectional view taken in the plane of line 11—11 of FIG. 10.

FIG. 12 is an enlarged exploded perspective view of a mounting table of the invention.

FIG. 13 is a bottom plan view of a central core of the mounting table shown in FIG. 12.

FIG. 14 is an enlarged fragmentary sectional view taken in the plane of line 14—14 of FIG. 13.

FIG. 15 is a fragmentary enlarged sectional view taken in the plane of line 15—15 of FIG. 13.

FIG. 16 is a fragmentary enlarged sectional view taken in the plane of line 16—16 of FIG. 11.

FIG. 17 is a fragmentary enlarged sectional view taken in the plane of line 17—17 of FIG. 10.

FIG. 18 is a fragmentary enlarged sectional view taken in the plane of line 18—18 of FIG. 17.

FIG. 19 is an enlarged sectional view taken in the plane of line 19—19 of FIG. 17.

FIG. 20 is an exploded perspective view of an exciter used in conjunction with the invention.

FIG. 21 is an enlarged sectional view of another embodiment of the exciter of the invention.

FIG. 22 is a sectional view taken in the plane of line 22—22 of FIG. 21.

FIG. 23 is a sectional view taken in the plane of line 23—23 of FIG. 21.

FIG. 24 is a sectional view taken in the plane of line 24—24 of FIG. 21.

FIG. 25 is an exploded perspective view of the is an exploded perspective view of the exciter shown in FIG. 21.

FIG. 26 is an exploded perspective view of another embodiment of the exciter of the invention.

DESCRIPTION OF THE PREFERRED EMBODIMENTS

A shaker apparatus includes a platform or mounting table attached to isolating supports 4 and one or more exciters 50. A device or manufactured product 6 to be tested is coupled or fixed to the mounting 20 table and the exciters 50 operated to shake the shaker apparatus and the attached device. A dispersive layer within the table structure and manipulation and arrangement of the exciters 50 allow the device to be subjected to randomly distributed multi axial and multi rotational, incoherent vibrations with a limited number of exciters 50 oriented in one or a limited number of directions and without the need for damping or complex shaker table construction.

Turn now to FIG. 1. The shaker apparatus comprises the mounting table 20 mounted to a foundation 2 by at least three of the supports 4, two of which are shown in FIG. 1. The foundation 2 is an essentially vibration-free support for the shaker apparatus. Although shown as being supported from below, the apparatus can also be supported from any direction.

The device 6 to be tested is securely fastened to the mounting table 20. Preferred methods of fastening include bolting a device or product 6 with a bolt 8 engaged in inserts (not shown) in the mounting table 20 (as shown in FIG. 1); clamping the device 6 onto the top surface of the mounting table 20; creating a vacuum between the device 6 and the surface of table 20; or using magnetic forces to attach device 6 to the top surface of the mounting table 20.

The mounting table 20 is mounted on the foundation 2 by a plurality of the supports 4, which supports 4 isolate the motion of the table 20 from the foundation 2. At least three supports 4 are required. The supports 4 are attached to the mounting table 20 through load spreaders or inserts in the table 20 to reinforce the table 20 at points of high local loading. One or more of the exciters 50 are attached to the mounting table 20. The exciters 50 are mounted to the mounting table 20 by vector supports 10. To a substantial degree only the vibrational energy generated by exciter 20 is coupled to the device 6 and all other extrinsic sources of energy or vibration are isolated therefrom. The exciters 50 each impart excitations to the mounting table 20 in only one direction, although this may, as discussed below, result in excitations appearing at the device 156 in any or all the six possible degrees of freedom of motion. An air source 12 is connected to an airline 14 which is, in turn, connected to the input of each of the exciters 50. This air source 12 supplies the air pressure which drives the exciters 50 to generate and impart vibrational energy to the mounting table 20.

The exciter 50 can be any device which imparts excitation to table 20. Preferably, the exciter 50 is a pneumatic air operated vibrator. The exciters 50 may be attached to any part of the mounting table 20. If more than one of the exciters 50 are used, they should ideally be positioned to impart orthogonal excitations with respect to one another.

In addition to being attached to the outside surface of the mounting table 20 (as shown in FIG. 1), the exciters 50 can be attached to the inside surface of or disposed within the mounting table 20 as shown in FIG. 2. This uniquely constructed mounting table 20 is constructed as a hollow or partially hollow cube or body. Since the exciters 50 are mounted inside the mounting table 20, more space is available on its outside surface for mounting the device 6 to be tested.

Any number of the exciters 50 may be used, but the attributes of the table and several methods of vectoring and modulating the excitations discussed below require only a limited number of the exciters 50 to impart multi axial vibrations to the device 6.

Referring to FIG. 3A, one embodiment of the mounting table 20 is constructed of honeycomb material. The mounting table 20 comprises a honeycomb assembly 30 sandwiched between a top surface sheet 32 and a bottom surface sheet 34. The honeycomb assembly 30 is attached at multiple points of contact to the top surface sheet 32 and the bottom surface sheet 34. The surface sheets 32 and 34 are constructed of plastic, metal or a composite material. The methods of attaching the surface sheets 32 and 34 to the honeycomb assembly 30 are preferably by adhesive bonding, diffusion bonding, welding or brazing.

The honeycomb assembly 30 comprises at least one layer 36 of honeycomb structure formed from undulating walls 38 which extend between the top and bottom surface sheets 32 and 34 in a first direction. The walls 38 define within the layer 36 of honeycomb structure an axis of maximum stiffness. Additional layers 36 of honeycomb structure, if present, are disposed in a second and third direction, as shown in FIG. 3D, which may be perpendicular to the first direction. Other angles of orientation may be used in order to attain the desired mechanical properties.

As best seen in the top section al view in enlarged scale in FIG. 3B, the layer 36 of the honeycomb assembly 30 is formed from the corrugated walls 38, which comprises thin vertically oriented metallic strips, e.g., of aluminum, which are bonded together at contacting surfaces 40 to form a hexagonal matrix of open ended cells. The layer 36 utilizes a conventional internal honeycomb structure and therefore has non isotropic stiffness. Due to the internal welding and periodic double wall structure where the strips attach one to the other, the layer 36 is stiffer in one direction than in the orthogonal direction.

The honeycomb assembly 30 may be comprised of the single layer 36 of honeycomb. It is preferred that the honeycomb assembly 30 be quite thick, namely one to four inches thick as measured along thickness 31 of FIG. 3A. However, as diagrammatically depicted in Figure 3A, the honeycomb assembly 30 may also be comprised of a plurality of the identical layers 36. Each of the plurality of the layers 36 can be of identical or different construction in relative thickness, weight, strength or cell size. The thickness 31 then is the cumulative thickness of the plurality of the honeycomb layers 36. In one preferred embodiment, the honeycomb assembly 30 is comprised of a plurality of the honeycomb layers 36, with the stiffer axis of the layers 36 alternately oriented in at least two different directions. The stiff axis is symbolically depicted in FIGS. 3B and 3C by a double-headed arrow. Each of the layers 36 in the plurality which comprises the honeycomb assembly 30 is attached to each of the next adjacent layers 36 by adhesive bonding, diffusion bonding, welding or brazing. A vertically stacked array of the layer; 36 is diagrammatically depicted in FIG. 3C wherein each of the layers 36 is disposed above or below the next adjacent layer 36 with its stiffer axis rotated to any arbitrary angle (illustrated in FIG. 3C as a 90-degree angle) relative to the orientation of the stiffer axis of the adjacent layer 36. FIG. 3D diagrammatically depicts a plurality of the layers 36 laid in a planar array wherein each of the layers 36 lies in the same plane of all the other layers 36 in the honeycomb assembly 30, but is arranged so that no two of the layers 36, sharing a common side, have the same spatial orientation in the plane relative to their stiff axes. Although the angle shown in FIG. 3D is 90 degrees, the angles or orientation may be arbitrarily chosen.

In the embodiment shown in FIG. 3A, the honeycomb assembly 30 is two or more of the layers 36 of honeycomb with a common inter layer surface sheet 42 attached between each adjacent pair of the layers 36. The inter layer surface sheets 42 are flat sheets of metal, preferably aluminum, and the method of attaching the inter layer surface sheets 42 to the layers 36 are preferably adhesion bonding, diffusion bonding, welding or brazing at their points of contact. The topmost and bottom-most of the layers 36 as shown in FIG. 3A are attached at their points of contact to the top surface sheet 32 and the bottom surface sheet 34.

Another embodiment of the mounting table 20 is shown in FIG. 4. A cored table 44 is a slab of material which has cores 46 formed at various locations along its top or outer surface. The material preferably has a high strength-to-weight ratio and could be titanium, magnesium or a composite of different materials.

In FIG. 4, each of the cores 46 has been drilled within approximately one quarter of an inch of each adjacent core 46. The cores 46 perform a similar function as the honeycomb assembly 30 of FIG. 3, in creating multiaxial vibrations from unidirectional excitation by diffusion through the cores 46.

In order to preserve strength in the cored table 44 each of the cores 46 is drilled to a depth which is less than the thickness of the slab. Thus, no core 46 is drilled entirely through the slab. In addition, the cored table 44 may have a surface sheet 48 bonded, braised or welded to the open cored surface to increase strength and stiffness.

In a second alternative embodiment, shown in FIG. 9, the mounting table 20 is formed principally of an aluminum central core 100, an upper surface of which has mounting holes 102 and 104 (FIGS. 12–14).

The bottom surface has cavities 106 and 108 formed therein through holes 110 formed in the bottom surface (FIG. 14). The cavities 106 and 108 are formed by milling or similar machine tooling process. The cavities 106 are smaller than the cavities 108. The cavities 106 are centered about the mounting holes 102. The holes 102 define positions at which the exciters 50 are mounted to the bottom surface of the mounting table 20. The cavities 106 are arrayed in patterns of four 112 (FIG. 13) about the mounting holes 102, leaving a larger area of solid aluminum in the central core 100 about the mounting holes 102. The mounting holes 102 define the center of a four cavity array 112 of the cavities 106 (FIG. 13). The larger square cavities 108 are formed in perpendicularly intersecting rows 114 and columns 116 between the mounting holes 102. The other mounting holes 104 are likewise used for mounting the manufactured devices 6 (not shown in this embodiment) to the mounting table 20.

After the central core 100 is formed, the bottom surface receives a layer of adhesive film 118, such as the adhesive film made by American Cyanamid Company under the trademark FM300K (FIG. 12). To that adhesive film 118 an aluminum alloy skin 120 is bonded, covering the mounting holes 104 and defining holes 102 aligning with the holes 102 in the core 100. The exciters 50 are mounted through the holes 102 to the mounting table 20. An integral bottom surface of the mounting table 20 is formed.

The top surface includes a rubber mounting sheet 122 through which sheet 122 are formed the holes 102 and 104. An insulating layer 123, such as sold under the trademark Zircar Type 100, is disposed between the central core 100 and the mounting sheet 122. The insulating layer 123 reduces thermal transfer between the mounting table and the exciters 50, and between the device under test and the exciters 50, which then reduces the potential for thermal damage of the exciters 50. As previously mentioned and as is best seen in FIG. 9, the holes 102 are formed at positions in the mounting table 20 where the exciters 50 connect to the bottom surface of the mounting table 20. The remaining holes 104 are more densely spaced among the rows 114 and columns 116 at positions where an exciter 50 is not attached (FIGS. 15 and 16).

The construction of the central core 100 with the cavities 106 and 108 allows for uniform dispersion of forces applied by the exciters 50.

In this manner, according to the invention, the internal structure of the mounting table 20, be it the cored table 44 or the cavities 106 and 108 of the central core 100, is broken up by the multiplicity of walls and cavities, which may be regularly disposed and formed from geometric shapes or arrays 112 as illustrated above, or may be arbitrarily shaped and/or randomly distributed throughout the volume of the mounting table 20. A mounting table 20 built up from a lattice of rectangular, triangular or any other shaped grid or complex of connected walls is expressly included within the scope of the invention.

The unidirectional excitations from the exciters 50 are randomly dispersed by the mounting table 20 resulting in substantially uniform, randomly oriented vibrations at device 6 in a predetermined spectrum range. Results of testing performed on a work piece using an embodiment of the apparatus similar to the embodiment shown in FIG. 1, and incorporating one layer of honeycomb between a top and bottom face sheet, clearly indicate the dispersive effects of the honeycomb structure.

The testing was performed on a test device weighing 70 pounds, which is considered to be substantially heavier than any electronic equipment which will be screened by the apparatus. The test device was securely fastened to the top surface sheet of the mounting table 20. The The mounting table was rectangular and four pneumatic exciters 50 were vertically attached to the top surface sheet with one exciter 50 being attached at each corner. Each exciter 50 was vectored in the Z direction and was made to impart vibrational excitations to the table 20. The magnitude of vibrations oriented in the x, y and z directions were measured at the test device.

FIG. 5A, 5B and 5C represent results of the above described test performed on the 70 pound test device. Comparisons of measured responses are shown in two directional axes with respect to each other over time. FIGS. 5D, 5E and 5F are representative of the amplitudinal responses along each axis over a frequency range. As clearly shown, the vibrational responses in the various axial directions are incoherent relative to one another indicating the dispersive effects of the shaker table.

Similar results have been measured in experiments using a table incorporating the cored slab shown in FIG. 4 and the central core 100 with the cavities 106 and 108 shown in FIG. 9 in lieu of the honeycomb assembly 30.

In order to further create multiaxial vibrations in the device 6 to be tested the arrangements of the exciters 50 may be varied.

A vectoring means can be attached to exciter 50 for vectoring the excitations imparted to the shaken table 10 to achieve a desired vibration balance between different axial directions. One such vectoring means is a wedge-shaped piece 11, shown in FIG. 6A.

In FIG. 6B the exciter 50 is shown as comprised of at least one pneumatic vibrator 52 having an input 54 and an output 56, and a modulation means to modulate the air pressure imparted to the input of each of the pneumatic vibrators 52. As shown in FIG. 6B the modulation means is comprised of a rotary ball vibrator 60 having an exhaust output 64 attached to the input 54 of a pneumatic vibrator 52 for imparting modulated air pressure into the pneumatic vibrator 52. A source of air pressure 12 is coupled to the input 62 of a rotary ball vibrator 60 to produce a pulsed output. The pulsed output is generated by the rotation of one or more balls 66 held in a retaining ring 67, which balls act as vanes in a circular air passage 68. The interruption of air flow as each ball 66 passes the outlet 64 creates a pulsating air pressure to the input 54 of vibrator 52. This in turn causes the line spectra output of the vibrator 52 to be smeared over a frequency range. The vibrator 60 may also be mechanically attached to the table 20.

In another embodiment diagrammatically depicted in FIG. 6C the modulation means comprises at least one accumulator 70 having an exhaust output 71 which is attached to the input 54 of the pneumatic vibrator 52. The accumulator 70 delivers pressurized air to the input of the pneumatic vibrator. An alternating control such as a solenoid controlled valve 72 is attached to the accumulator 70 to alternately start and stop the flow of air through the accumulator 70 for supplying a continuously varying air pressure to the pneumatic vibrator 52 from the air supply 12. Again, this causes the line spectra output of the vibrator 52 to be smeared over a frequency range.

In another embodiment, shown in FIG. 6D, an analog voltage controlled valve 74 such as manufactured by Norgren under Model Designation 53–5004–00 is used to modulate the inlet air pressure to the vibrators.

An analog pressure regulator is used in a closed loop control system to maintain a given average vibration level. The regulator can also provide modulation of the air pressure.

In another embodiment, shown in FIG. 6E, the exhaust of one pneumatic exciter is attached and used to drive a set of one or more of the exciters 50. This provides a varying inlet pressure to the set of exciters and also provides a varying back pressure to the first exciter. The net effect is to smear the line spectra.

In another embodiment, shown in FIG. 6F, two or more of the exciters 50 are supplied with air from a manifold 76 or air line 14. The line or manifold pressure is not constant due to the pulsing flow as various exciters take in quantities of air from the manifold 76 or line 14. The effect is particularly pronounced if one exciter 50 uses substantially more air per stroke of the cycle than the others.

Any combination of the above may be utilized as depicted in FIG. 6G where air line 14 is split into two paths to two large exciters 51. One of the large exciters 51 has its input 54 restricted. Each of the large exciters 51 has its exhaust output 56 connected to input 54 of one or more smaller exciters which in turn are attached to the mounting table 20. This provides a cascading modulation of the vibrations to the table 20. The exciters 51 are usually attached to the fixture, but are shown as detached here.

In another embodiment, as diagrammatically depicted in FIG. 7A, the modulation means comprises a throttle 78 to throttle or restrict the exhaust from the output 56 of pneumatic exciter 52, changing the repetition or cycle rate of the exciter 52. This method may be used to achieve a different cycle rate of each exciter and thereby smear the vibration spectra experienced by the device 6.

In another embodiment, diagrammatically depicted in FIG. 7B, a rotary ball vibrator 60 is attached to the mounting table 20. The vibrator 60 has its input 62 supplied with air pressure from a source 12 via a line 14. The exhaust 64 of the vibrator 60 is connected to the inlet of a manifold 76 via a line 15. The manifold 76 has at least two outlets each supplying air pressure through line 14 to a pneumatic vibrator 52 which is attached to table 20. This causes an additional vibrational spread between different axial directions and frequencies.

In yet another embodiment depicted in FIG. 7C, a pop-off valve 79 is used to control the air pressure in vibrators 52. The pop-off valve 79 can either be connected to the input 54 of a vibrator 52 (as depicted in the dashed box 1) or to the exhaust output 56 of a vibrator 52 (as depicted in dashed box 3). In either case, the pop-off valve 79 opens according to its design at a given first air pressure and closes at a second lower air pressure. Connection of the pop-off valve 79 to the input 54 of the vibrator 52 modulates the pressure into the vibrator 52. Connection of the pop-off valve 79 to the output 56 modulates the back pressure to the vibrator 52 changing the repetition frequency of the vibrator 52 and smearing the line vibration spectrum seen at the device 6.

The line spectrum generated by each of the exciters 50 is generated by the cycle rate of the exciter 50. The spectra will contain the fundamental repetition frequencies and all harmonics of that rate. The exciter 50 can be made to have different cycle rates even when supplied with the same air pressure by changing either the stroke, piston weight or port timing slightly.

To obtain the desired spectrum shape, a tunable damper for notching the vibration spectrum is depicted in FIG. 8. A mass 80 is placed between two progressively wound springs 82. A spring load adjusting means 84 for reloading the springs 72 is provided to compress the coils and change the spring rate and thereby the natural frequency of the vibration. The means for reloading the springs is adjustable. Any means for spring compression may be utilized, such as a movable pressure plate bearing against one end of the springs and adjusted by a lockable screw drive. This will then generate a user tunable damper for notching the vibration spectrum after the damper is attached to the mounting table 20. Alternatively, adjustable damping is established by throttling air to the mass 80, instead of using the wound springs.

Each of the exciters 50 (FIGS. 17–20) includes a piston assembly 124 slidable within a cylinder 126. The piston assembly 124 is connected to the mounting table 20 by a piston mounting bolt 128 and washer 130. The mounting bolt 128 has a threaded end 129 that is tightened in a conventional fashion into the tapped hole 102 of mounting table 20. Tapped hole 102 extends all of the way through mounting table 20. A pair of titanium spacers 132, 132' and the titanium bolt 128 and washer 130 thermally insulate the exciter 50 from the mounting table 20 (FIG. 17). The thermal insulation provided by the spacers 132, 132' and the mounting bolt 128 reduces thermal transfer between the mounting table and the exciters 50, and between the device under test and the exciters 50, which then reduces the potential for thermal damage of the exciters 50. The cylinder 126 has a chamfered end 134 and an open end closed by an end cap 136 secured by threaded bolts 138. The chamfered end 134 of cylinder 126 has a bore 131 and the spacers 132, 132' each have a bore 133, 133' so that the threaded end 129 of mounting bolt 128 can extend through them and into the threaded bore 102 of table 20. The threaded end 129 of mounting bolt 128 can have a tapped center bore 135 so that the threaded end of device mounting bolt 8 (FIG. 1) can be connected to the table 20 via the end 129 of bolt 128, as shown in FIG. 17 as an alternative to using a top mounting hole 104, as shown in FIGS. 15 and 16. Device mounting bolt 8, therefore, can be used to rigidly connect the device 6 under test (not shown in FIG. 17, but shown in FIG. 1) to the mounting table 20, the mounting bolt 128, the spacers 132, 132' and the exciters 50, as shown in FIG. 17. Furthermore, providing a tapped center bore 135 in the mounting bolt 128 provides more attachment options when determining how to attach the device 6 under test to the mounting table 20.

The piston assembly 124 includes a piston body 140 connected to a resilient programmer 142 (FIG. 20). The piston assembly 124 slides along the interior of the cylinder 126. The programmer 142 is of resilient polymeric material such as Dupont Delrin 100 while the piston body 140 of the piston assembly 124 is made of steel or aluminum.

The piston assembly 124 moves in a reciprocal manner interiorly of the cylinder 126 under the influence of pressurized air admitted to the cylinder 126 through an air pressure inlet hose 144 and fitting 146.

The piston assembly 124, with reference to FIGS. 17 and 18, moves to the left in a thrust stroke, striking a rebound surface 148 of the cylinder 126 and imparting a force across the chamfered surface 134 to the mounting table 20. The rapid movement of the piston assembly 124 would heat and melt the polymeric material of the programmer 142 absent cooling passageways 150, defining means for cooling the programmer 142.

In the thrust stroke, air is admitted through the air pressure inlet conduit 144 to an inlet thrust passageway 152 formed in the piston body 140. Air exhausts into a thrust chamber 154 formed interiorly of the cylinder 126. The piston assembly 124 moves toward the rebound surface 148, exhausting air in a rebound chamber 156 through an exhaust port 158.

At the completion of the thrust stroke, a distribution ring 160 in fluid communication with the air pressure inlet 144 admits pressurized air to a rebound inlet passageway 162 formed in the cylinder 126. The rebound inlet passageway 162 is in fluid communication with a central chamber 164 of the piston body 140 which is in fluid communication with a central passageway 166 of the programmer 142. In turn, the central passageway 166 is in fluid communication with the laterally extending cooling passageways 150. The passageways 150 extend laterally away from the central passageway 166 uniformly around the circumference of the programmer 142.

The rebound stroke begins with pressurized air moving from the distribution ring 160, through the inlet passageway 162 and the central chamber 164, through the piston body 140 and into and out of the programmer 142 through the passageways 166 and 150.

The rebound chamber 156 is pressurized and the piston assembly 124 moves from the rebound chamber 156 toward the thrust chamber 154.

A mounting system 168 (FIGS. 9 and 11) includes four hangers 170 secured to walls of a thermal chamber 172, for testing the device 6 under various thermal conditions. The hangers 170 support springs 174 which allow multi-axial movement of the entire mounting table 20. Standard bolt connections 175 are used to connect the springs 174 to the mounting table 20.

The hangers 170 are releasably connected to the walls of the thermal chamber 172. Various attachment positions are provided on the walls so that the vertical position of the mounting table 20 can be changed. This feature permits the chamber volume to be increased or decreased, depending on the size of the device 6. An increased or decreased chamber volume respectively increases or decreases the surface area of the walls of the chamber 172 that need to be heated. As a result, higher temperatures are realized for a given volume or less power is used to achieve a given temperature.

In an alternative embodiment of the exciter 50 shown in FIGS. 21 through 26, like parts retaining the numbers used in the preferred embodiment, the exciter 50 includes a piston assembly 176 which reciprocates within a cylinder 178 at a variable cycle rate. The piston assembly 176 includes a tubular inner sleeve 180 fixedly connected to the cylinder 178 and a piston 182, which piston 182 is slidable and randomly rotated within the inner sleeve 180. A variable rate cycle is induced mechanically by varying the inlet port timing during the thrust stroke, and or by varying the exhaust port timing during the rebound stroke. The variable cycle rate of the alternative embodiment of the exciter 50 helps the shaker table 10 deliver multi-axial broadband continuous frequency distribution vibrations to the mounted manufactured device 6 being tested.

The piston 182 is randomly rotated as part of the variable reciprocation timing. Angling an inlet port 184 of the inner sleeve 180 relative to air received from the air inlet 144 imparts a rotation to the piston 182. The angling is relative to a radius of the cylinder 178 (FIG. 25). With reference to FIGS. 21 and 22, the piston 182 is rotated relative to port inlet 184. A programmer 186 is fixedly positioned relative to the cylinder 178 by a set screw.

An angular inlet and exhaust port 188 of the piston 182 is variably covered or uncovered relative to the distribution ring 160. A curvilinear surface 196 of the sleeve 180 registers with the distribution ring 160. This structure varies the amount of pressurized air admitted to a thrust passageway 190 of the piston 182, randomly varying the cycle rate of the piston assembly 176. As the angular port 188 reaches the surface 196 the amount of air admitted to the piston 182 for the thrust stroke is randomly varied, depending on the rotational position of the piston relative to the surface 196. This allows varying amounts of air from the inlet 144 to reach the port 188.

The thrust stroke is initiated through the angled air inlet 184, air being directed around the distribution ring 160 from the air inlet 144. The angular port 188 of the piston 182 receives the pressurized air from the inlet 184, the amount of pressurized air depending on the rotational position of the piston 182. The thrust passageway 190 of the piston 182 receives the air from the port 188 and is in fluid communication with a thrust chamber 192. The piston 182 moves toward impact with a rebound surface 194 defined by the resilient programmer 186.

As the piston 182 moves within the inner sleeve 180, the port 188 opens into a second curvilinear surface 197 of the inner sleeve 180. The air is exhausted through the programmer 186, the cooling passageways 150 and central passageway 166 to the exhaust port 158. Just as was the case with the curvilinear surface 196, the amount of air exhausted from the port 188 is altered depending on the extent to which the port 188 is covered or uncovered. This structure enhances the random cycle rate, either alone or in conjunction with the curvilinear surface 196.

The rebound stroke is initiated as the piston 182 strikes the rebound surface 194 of the programmer 142. The piston 182 is forced away from the rebound surface 194 and toward the thrust chamber 192, where the thrust stroke is reinitiated. It is appreciated that the length of the stroke varies depending on the amount of air initially supplied in the thrust stroke and/or exhausted in the rebound stroke.

A modified piston 183 which is randomly rotated by vectored passageways 185 in fluid communication with the thrust passageway 190 is shown in FIG. 26. A cap 187 covers the vectored passageways 185. Notches 189 are formed in the cap 187 so that the exhaust of the piston 183 is directed from the passageway 190 and into the thrust chamber 192. This vectored flow imparts a random rotation to the piston 183 during each thrust stroke. Randomness is imparted, as previously described, by the inlet and exhaust port timing. This construction may be utilized in lieu of, or in combination with, the angled inlets 184 shown in FIGS. 23 and 25.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The embodiments of the invention in which an exclusive property or privilege is claimed are defined as follows:

1. Screening apparatus for imparting vibrational acceleration forces to a device to be tested, comprising:

a shaker table having a top surface and a bottom surface with device mounting means for securely attaching the device to said top surface; and an exciter that produces vibrational acceleration forces with exciter mounting means for connecting said exciter to said bottom surface of the table, said exciter mounting means including said table having a table hole extending through said table from said bottom surface to said top surface and including said exciter having an exciter hole that extends through said exciter and aligns axially with said table hole an exciter mounting bolt extending through said exciter hole in said exciter and into said table hole said exciter mounting bolt having a tapped center bore extending axially into said exciter mounting bolt in a manner that is accessible from the top surface of the table for receiving and fastening a threaded device mounting bolt into said exciter mounting bolt.

2. The screening apparatus of claim 1, wherein said exciter mounting bolt comprises titanium.

3. The screening apparatus of claim 1, including an insulating spacer disposed between said table and said exciter.

4. The screening apparatus of claim 3, wherein said spacer comprises titanium.

5. The screening apparatus of claim 4, including two spacers comprising titanium positioned between said table and said exciter in such a manner that one of said spacers is positioned between the other of said spacers and said table to provide a surface of said one spacer in interfacing contact with a surface of said other spacer.

6. The screening apparatus of claim 5, wherein said exciter mounting bolt comprises titanium.

7. Screening apparatus for imparting vibrational acceleration forces to a device to be tested, comprising: a shaker table having a top surface and a bottom surface with device mounting means for securely attaching the device to said top surface; and an exciter that produces vibrational acceleration forces with exciter mounting means for connecting said exciter to said bottom surface of the table, said exciter mounting means including said table having a table hole extending through said table from said bottom surface to said top surface and including said exciter having an exciter hole that aligns axially with said table hole extending through said table, an exciter mounting bolt extending through said exciter hole in said exciter and into said table hole extending through said table, said exciter mounting bolt comprising a thermal insulating material that transfers shock waves produced by said exciter to said shaker table without inhibition.

8. The screening apparatus of claim 7, wherein said thermal insulating material includes titanium.

9. The screening apparatus of claim 7, including an insulating spacer disposed between said bottom surface of said table and said exciter.

10. The screening apparatus of claim 9, wherein said spacer comprises titanium.

11. The screening apparatus of claim 10, including two spacers comprising titanium positioned between said table and said exciter in such a manner that one of said spacers is positioned between the other of said spacers and said table to provide a surface of said one spacer in interfacing contact with a surface of said other spacer.

12. The screening apparatus of claim 11, wherein said exciter mounting bolt comprises titanium.

13. A shaker apparatus, comprising:

a mounting table having a top surface and a plurality of layers, wherein said plurality of layers includes a first insulating layer positioned parallel to said top surface of said mounting table and between two other of said plurality of layers;

mounting means coupled to said mounting table for rigidly supporting a device;

exciter means for imparting excitations to said mounting table;

securing means to attach said exciter means to said mounting table; and second insulating means for reducing thermal transfer from said mounting table to said exciter means.

14. The shaker apparatus of claim 13, wherein said insulating means includes a spacer rigidly positioned between said mounting table and said exciter means.

15. The shaker apparatus of claim 14, wherein said spacer comprises titanium.

16. The shaker apparatus of claim 13, wherein said mounting table includes a tapped bore, said exciter means includes a bore extending through a portion of said exciter means, and said securing means includes a first bolt that is threaded at one end and positioned through said bore of said exciter means such that said threaded end of said first bolt is receivable in said tapped bore.

17. The shaker apparatus of claim 16, wherein said first bolt comprises a thermal insulating material.

18. The shaker apparatus of claim 17, wherein said thermal insulating material includes titanium.

19. The shaker apparatus of claim 16, wherein said second insulating means includes a spacer positioned between said mounting table and said exciter means.

20. The shaker apparatus of claim 19, wherein said spacer includes a bore extending through said spacer such that said first bolt is positioned through said spacer bore.

21. The shaker apparatus of claim 16, wherein said threaded end of said first bolt includes a center-tapped bore.

22. The shaker apparatus of claim 21, wherein:

said mounting table bore extends completely through said mounting table and said first bolt is positioned in said mounting table bore so that said first bolt passes through said mounting table bore with said threaded end of said first bolt extending to the surface of said mounting table holding said device; and said mounting means includes a second bolt having a threaded end that is receivable into said center-tapped bore of said first bolt, such that said device, having a bore through which said second bolt can be positioned, can be rigidly attached to said first bolt and said mounting table.

23. The shaker apparatus of claim 22, wherein said second bolt comprises a thermal insulating material.

24. The shaker apparatus of claim 23, wherein said second bolt comprises titanium.

25. Screening apparatus for imparting vibrational acceleration forces to a device to be tested, comprising:

a shaker table having a top surface and a bottom surface with device mounting means for securely attaching the device to said top surface;

an exciter that produces vibrational acceleration forces, said exciter including mounting means for connecting said exciter to said bottom surface of the table, said exciter mounting means including said table having a table hole extending through said table from said bottom surface to said top surface and including said exciter having an exciter hole that aligns axially with said table hole extending through said table, an exciter mounting bolt extending through said exciter hole in said exciter and into said table hole extending through said table, said exciter mounting bolt comprising a thermal insulating material; and two spacers comprising titanium positioned between said shaker table and said exciter in such a manner that one of said spacers is positioned between the other of said spacers and said shaker table to provide a surface of said one spacer in interfacing contact with a surface of said other spacer.

26. The screening apparatus of claim 25, wherein said exciter mounting bolt comprises titanium.

27. Screening apparatus for imparting vibrational acceleration forces to a device having a bore extending through the device, comprising a mounting table having a tapped bore extending completely through said mounting table;

mounting means coupled to said mounting table for rigidly supporting the device, wherein said mounting means includes a mounting bolt having a threaded end which can be positioned through the bore extending through the device;

exciter means for imparting excitations to said mounting table, wherein said exciter means includes a bore extending through a portion of said exciter means;

securing means to attach said exciter means to said mounting table, wherein said securing means includes a first bolt that is threaded at one end and has a center-tapped bore at said threaded end, said first bolt being positioned through said bore of said exciter means such that said first bolt passes through said mounting table bore with said threaded end of said first bolt extending to the surface of said mounting table holding said device, further wherein said mounting bolt is receivable into said center tapped bore of said first bolt such that said device can be rigidly attached to said first bolt and said mounting table; and insulating means for reducing thermal transfer to said exciter means.

28. The shaker apparatus of claim 27, wherein said mounting bolt comprises a thermal insulating material.

29. The shaker apparatus of claim 28, wherein said mounting bolt comprises titanium.

* * * * *